United States Patent
Sawada et al.

(10) Patent No.: US 7,515,992 B2
(45) Date of Patent: Apr. 7, 2009

(54) ROBOT APPARATUS AND EMOTION REPRESENTING METHOD THEREFOR

(75) Inventors: Tsutomu Sawada, Tokyo (JP); Hiroaki Ogawa, Chiba (JP); Osamu Hanagata, Tokyo (JP)

(73) Assignee: Sony Corporation, Tokyo (JP)

( * ) Notice: Subject to any disclaimer, the term of this patent is extended or adjusted under 35 U.S.C. 154(b) by 886 days.

(21) Appl. No.: 11/029,866

(22) Filed: Jan. 5, 2005

(65) Prior Publication Data

US 2005/0216121 A1 Sep. 29, 2005

(30) Foreign Application Priority Data

Jan. 6, 2004 (JP) ............................. 2004-001368

(51) Int. Cl.
*G06F 19/00* (2006.01)
(52) U.S. Cl. .................................. 700/245; 318/568.11
(58) Field of Classification Search ................. 700/246, 700/245, 250, 253; 318/568.11; 382/153; 713/300; 701/28, 23; 901/46, 47
See application file for complete search history.

(56) References Cited

U.S. PATENT DOCUMENTS

| | | | |
|---|---|---|---|
| 6,449,518 B1 * | 9/2002 | Yokoo et al. | 700/86 |
| 6,452,348 B1 * | 9/2002 | Toyoda | 318/3 |
| 6,708,081 B2 * | 3/2004 | Yoshida | 700/245 |
| 2004/0189702 A1 * | 9/2004 | Hlavac et al. | 345/757 |
| 2005/0151496 A1 * | 7/2005 | Furuta et al. | 318/568.12 |

* cited by examiner

*Primary Examiner*—Dalena Tran
(74) *Attorney, Agent, or Firm*—Frommer Lawrence & Haug LLP; William S. Frommer; Thomas F. Presson

(57) ABSTRACT

A robot apparatus in which the storage capacity necessary for holding motion data is diminished in representing the emotion by motions exploiting the body resources. In demonstrating component behaviors of the robot apparatus, the basic posture, as the posture at the start time of one or plural movements forming a component behavior, is changed to express the emotion. Specifically, the robot apparatus includes variations for expressing the emotion for the basic posture (basic posture for the emotion). The respective resources are actuated from the basic posture for the emotion and reversion is made again to the basic posture to demonstrate the emotion.

10 Claims, 23 Drawing Sheets

BASIC POSTURE
(USUAL UPSTANDING POSTURE)

BASIC POSTURE
(USUAL UPSTANDING POSTURE)

MOTION START

MOTION END time

ROBOT APPARATUS AND EMOTION REPRESENTING METHOD THEREFOR

BACKGROUND OF THE INVENTION

1. Field of the Invention

This invention relates to an autonomous robot apparatus, including an emotion model, that is, the emotion, such as instinct or feeling, as modeled, and which is capable of representing the own emotion, and a method for representing the emotion.

This application claims priority of Japanese Patent Application No. 2004-001368, filed on Jan. 6, 2004, the entirety of which is incorporated by reference herein.

2. Related Art

Recently, studies and investigations are going on in the field of a humanoid robot or an entertainment robot, as a new robot apparatus, distinct from industrial robot apparatus.

A majority of conventional robot apparatus, handled as a sort of toy machines, exploit only external stimuli as a trigger for behavior selection, with a fixed relation between the user actions and the response motion. The result is that the user readily feels tired of the toy merely repeating the same response to the same external stimuli.

On the other hand, there has recently been proposed a robot apparatus having an emotion model which has modeled the emotion typified by instinct or feeling. This sort of the robot apparatus is able to vary the emotion through interactions with the environment, including the human being, to represent the so varied emotion, and hence is improved in entertainment properties.

If a user is to recognize the emotion of the robot apparatus, having such emotional model, the manner in which the robot apparatus represents its emotion is crucial. The following methods have so far been proposed for the robot apparatus to represent the emotion for the user.

(1) The apparatus includes body resources (devices) dedicated for emotion representation.
(1-1) The emotion is represented by the colors of the LEDs (light emission devices).
   For example, the emotion 'anger' is represented by 'red', and the emotion for 'sadness' is represented by 'blue'.
(1-2) The emotion is represented by a 'tail' for simulating a dog or a cat.
   For example, the emotion of 'anger' is represented by tucking the tail upwards, while the emotion of 'sadness' is represented by tucking the tail downwards.
(1-3) The motion is represented by a 'eyebrows' for simulating the face of a human being.
   For example, the emotion 'anger' is represented by 'raising eyebrows', and the emotion for 'sadness' is represented by 'lowering the eyebrows'.
(2) The speech is modulated by the emotion.
   For example, the emotion 'anger' is represented by 'raising the pitch, rate or amplitude of the speech', and the emotion for 'sadness' is represented by 'lowering the pitch, rate or amplitude of the speech'.

These emotion representing methods permit facilitated control with advantage because the body resources used for emotion representation are isolated from the other body resources (hands, legs, head or waist in the case of a robot apparatus simulating a living body). However, these methods suffer a deficiency that the body resources usable for emotion representation are limited and hence the emotion expressing force leaves much to be desired.

If, in substitution for or in addition to the above-described emotion representing methods, the emotion representation by motions employing the body resources is possible, more abundant emotion representation presumably becomes possible to improve the entertainment properties of the robot apparatus further. Up to now, the following methods have been proposed for emotion representation by motions employing the body resources. Meanwhile, the method of (3-2) has been proposed in the Patent Publication 1, shown hereinbelow.

(3) The motions exploiting the body resources are used for emotion representation.
(3-1) The motions associated with the respective emotions are formed.
   For example, for motions such as 'bowing' or 'kicking', variations added by the emotion are prepared.
(3-2) In executing the motions, the motions are modulated depending on the Emotions.
   For example, in reproducing the motions, such as 'bowing' or 'kicking', a suitable frequency is superposed on a suitable body resource for real-time generation of a motion added by the emotion.

[Patent Publication 1] Japanese Laid-Open Patent Publication 2003-89085

However, with the above method (3-1), in which the body resources dedicated to emotion representation are not needed with advantage, it is necessary to prepare motion data, added by the emotion for each motion, at the outset, while the storage capacity needed for holding motion data is increased.

With the method (3-2), in which the motion data, added by the emotion for each motion, does not have to be prepared at the outset, and the storage capacity for holding motion data is not needed, the processing volume is increased with real-time motion generation.

SUMMARY OF THE INVENTION

In view of the above-depicted status of the art, it is an object of the present invention to provide a robot apparatus in which, in representing the emotion by the motions employing body resources, the motion added by the emotion does not have to be generated in real-time, while the storage capacity necessary for holding motion data may be diminished, and a method for representing the emotion.

For accomplishing the above object, the present invention provides an autonomous robot apparatus having an emotion model, or a modeled emotion, and capable of expressing the own emotion, in which the apparatus comprises emotion management means for detecting and supervising the emotion of the robot apparatus, a plurality of behavior describing modules, each describing a preset behavior, and behavior selection means for selecting one or more of the behavior describing modules for demonstrating the behavior described in the behavior describing module selected. When one of the behavior describing modules is selected by the behavior selection means, the behavior describing module selected causes a change in a basic posture as a posture at each beginning time point of one or plural motions forming the behavior described in the behavior describing module selected, responsive to the current emotion detected by the emotion management means.

For accomplishing the above object, the present invention also provides an emotion representing method for an autonomous robot apparatus having an emotion model, or a modeled emotion, and capable of expressing the own emotion, in which the method comprises an emotion management step of detecting and supervising the emotion of the robot apparatus, a behavior selection step of selecting one or a plurality of the behavior describing modules, each describing a preset behavior, for demonstrating the behavior described in the behavior describing module selected. When one of the behavior describing modules is selected by the behavior selection step, the behavior describing module selected causes a change in a basic posture as a posture at each beginning time point of one or plural motions forming the behavior described in the behavior describing module selected, responsive to the current emotion detected by the emotion management step.

With the robot apparatus and the emotion representing method therefor, when one or more behavior describing modules, out of plural behavior describing modules, are selected, the so selected behavior describing module is responsive to the current emotion to cause a change in the basic posture of one or more behaviors making up the behavior described therein

DESCRIPTION OF THE PREFERRED EMBODIMENTS

Figure 1:
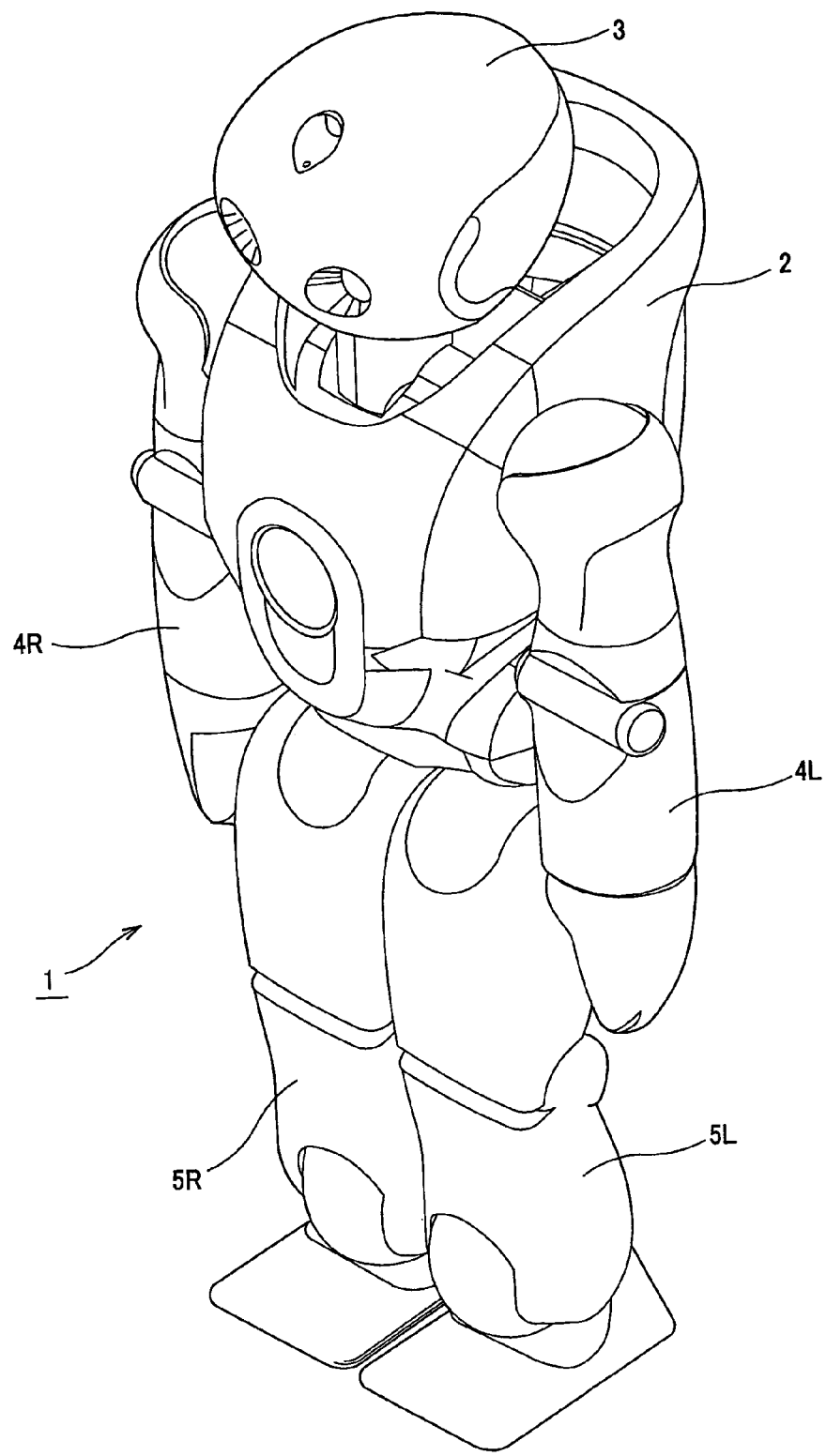
FIG. 1 is a perspective view of a robot apparatus embodying the present invention.

Referring to the drawings, specified embodiments of the present invention are explained in detail with reference to the drawings. In the embodiments illustrated, the present invention is applied to a robot apparatus, such as a pet type robot or a humanoid robot, simulating the living body and capable of having interactions with a user. Here, the structure of such a robot apparatus is first explained, a behavior selecting and controlling system for selecting an autonomously demonstrated behavior in a control system for the robot apparatus is then explained, and finally the control system for the robot apparatus, inclusive of such behavior selecting and controlling system, is explained.

(A) Structure of Robot Apparatus

FIG. 1 is a perspective view showing the appearance of the present embodiment of a robot apparatus 1. Referring to FIG. 1, the robot apparatus 1 includes a body trunk unit 2, to which are connected a head unit 3, left and right arm units 4R/L and left and right leg units 5R/L. It is noted that R and L denote suffixes indicating left and right, respectively, hereinafter the same.

Figure 2:
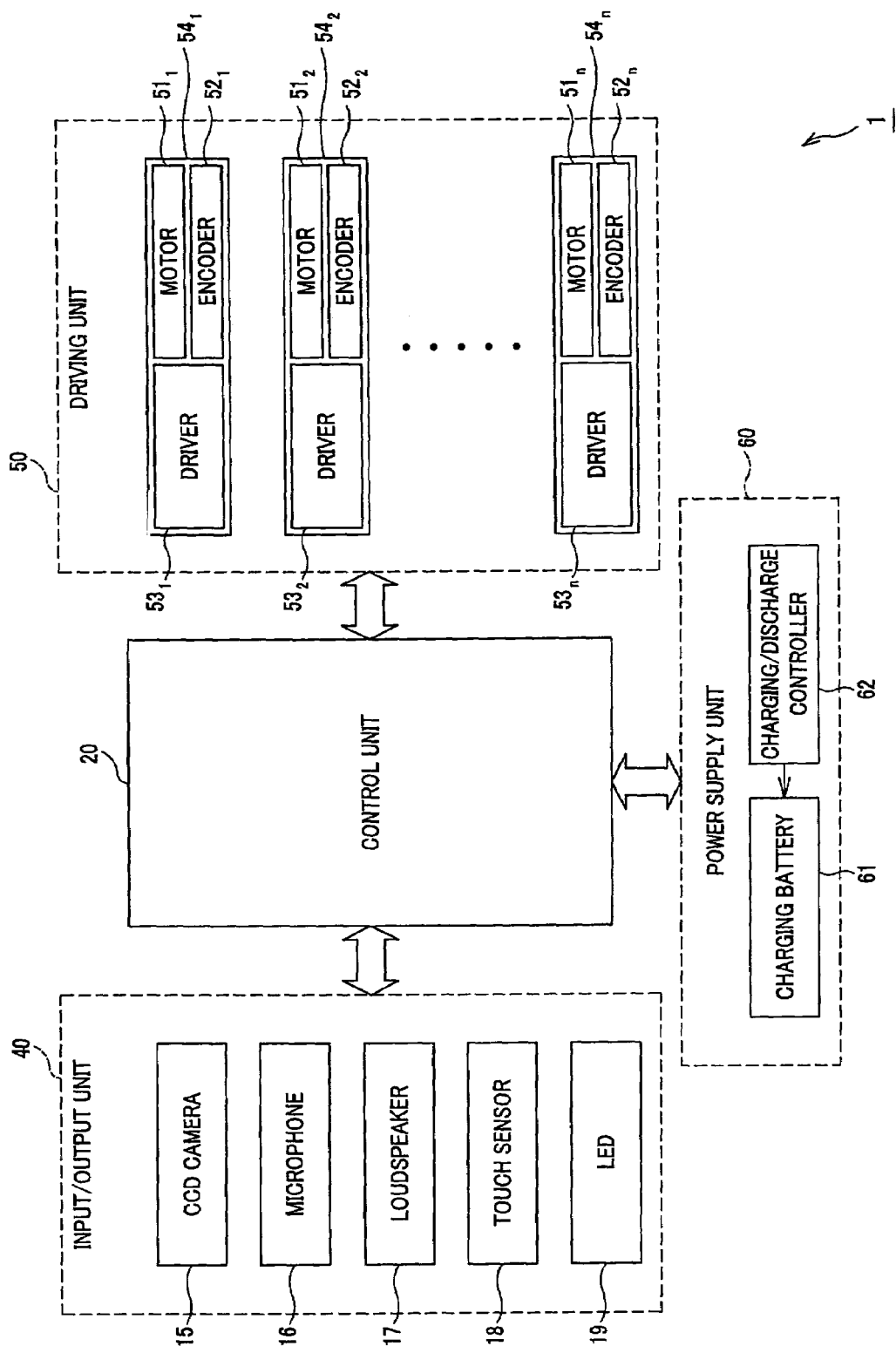
FIG. 2 is a schematic block diagram showing the functional structure of the robot apparatus embodying the present invention.

FIG. 2 is a schematic block diagram showing the functional structure of the robot apparatus 1 of the present embodiment. Referring to FIG. 2, the robot apparatus 1 is made up by a control unit 20 for managing comprehensive control of the entire operation and other data processing, an input/output unit 40, a driving unit 50, and a power supply unit 60. These component units are hereinafter explained.

The input/output unit 40 is includes a CCD camera 15 for capturing an outside state, as a member equivalent to an eye of a human, a microphone 16, equivalent to an ear of the human, and a variety of sensors, such as a touch sensor 18, electrically detecting the preset pressure to sense the touch by the user, a distance sensor for measuring the distance up to a forwardly located object, a gyro sensor, equivalent to five senses of the human being, as input units. The robot apparatus 1 also includes, as output units, a loudspeaker 17, provided to the head unit 3, and equivalent to the mouse of the human, and an LED indicator 19 (eye lamp), provided at a location corresponding to the eye of the human and expressing the feeling or state of visual recognition. These output units are capable of expressing the user feedback from the robot apparatus 1 in a form different from mechanical movement patterns by legs, such as by voice or by flickering of the LED indicator 19.

For example, plural touch sensors 18 may be provided to preset locations of the scalp of the head unit, and contact detection in each touch sensor 18 may be exploited in a compounded manner to detect behaviors from the user, such as 'stroking', 'hitting' or 'patting' on the head part of the robot apparatus 1. For example, if it is detected that a certain number of pressure sensors have been acted upon sequentially one after another at an interval of preset time, this state is determined to be the 'stroked' state. If a certain number of pressure sensors have been acted upon sequentially at shorter time intervals, this behavior is determined to be 'hit' state. The inner state is changed accordingly. Such change in the inner state may be expressed by the aforementioned output units.

The driving unit 50 is a functional block for realization of the movements of the main body unit of the robot apparatus 1, in accordance with a preset movement pattern, as commanded by the control unit 20, and is a subject controlled by behavior control. The driving unit 50 is a functional module for realization of the degrees of freedom in each joint of the robot apparatus 1, and is made up by plural driving units $54_1$ to $54_n$, provided to respective axes of the pitch, roll and yaw in each joint. These driving units $54_1$ to $54_n$ are made up by motors $51_1$ to $51_n$, carrying out rotational movements about preset axes, encoders $52_1$ to $52_n$, for detecting rotational positions of the motors $51_1$ to $51_n$, detecting the rotational positions of the motors $51_1$ to $51_n$, and drivers $53_1$ to $53_n$ for adaptively controlling the rotational positions or rotational speeds of the motors $51_1$ to $51_n$ based on outputs of the encoders $52_1$ to $52_n$.

Although the present robot apparatus 1 walks on two legs, it may also be constructed as a mobile robot apparatus, walking on four legs, depending on the combination of the driving units.

The power supply unit 60, as its name implies, is a functional module for feeding the power for respective electrical circuits in the robot apparatus 1. The present robot apparatus 1 is of the autonomous driving type, employing a battery. The power supply unit 60 is made up by a charging battery 61, and a charging/discharge controller 62 for supervising the charging/discharge state of the charging battery 61.

The charging battery 61 is formed as a 'battery pack' composed of plural lithium ion secondary cells enclosed in a cartridge.

The charging/discharge controller 62 comprehends the residual capacity of the battery 61, by measuring e.g. the terminal voltage, charging/discharge current or the ambient temperature of the battery 61, to determine the charging start time and the charging termination time of the battery 61. The charging start time and the charging termination time are notified to the control unit 20 for use as a trigger for the robot apparatus 1 to start and terminate the charging operations.

The control unit 20 is equivalent to the 'brain' and is loaded on, for example, a head or trunk part of the main body unit of the robot apparatus 1.

Figure 3:
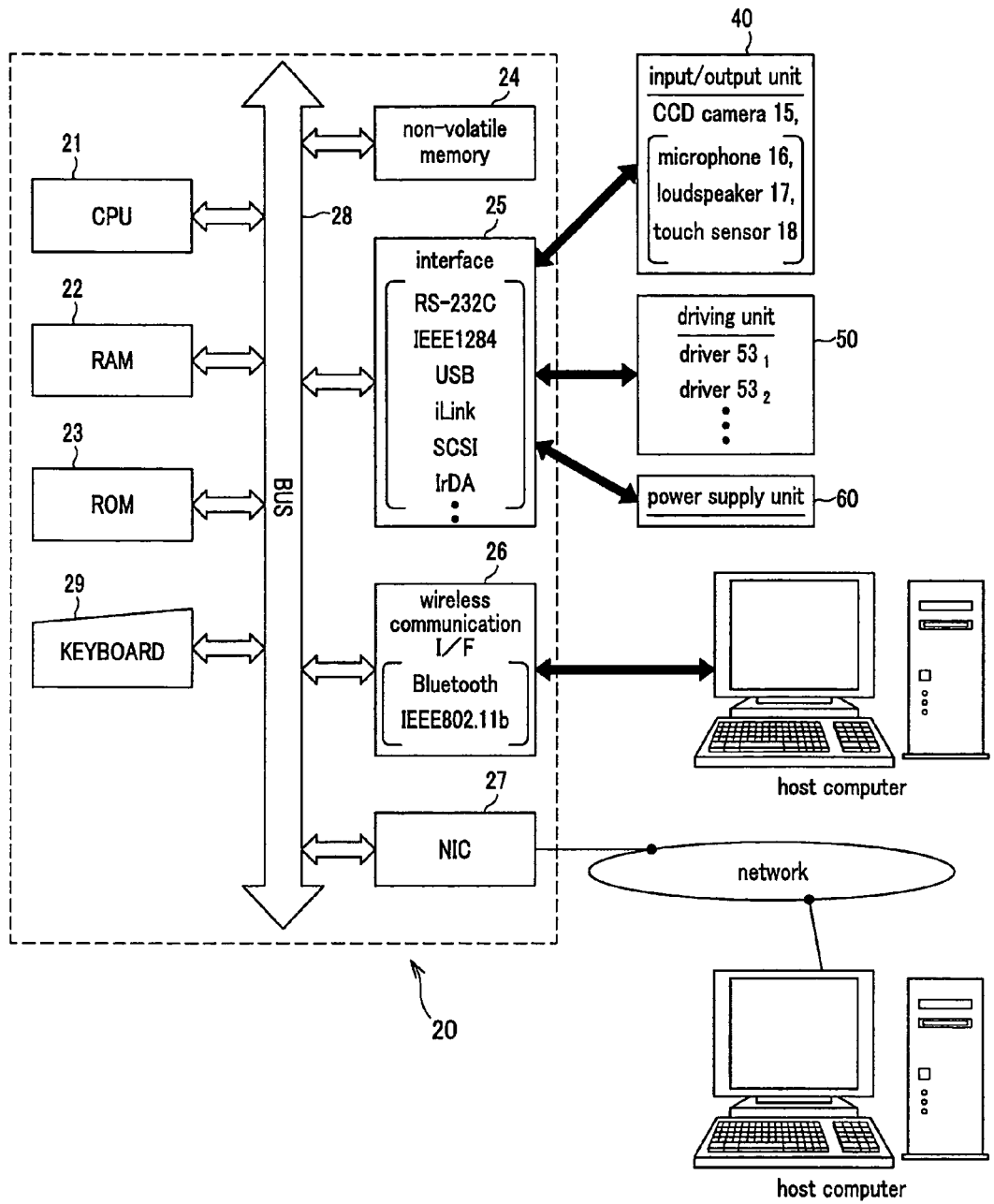
FIG. 3 is a block diagram showing the structure of a control unit, embodying the present invention, in further detail.

FIG. 3 depicts a block diagram showing the structure of the control unit 20 in further detail. Referring to FIG. 3, the control unit 20 is made up by a CPU (central processing unit) 21, as a main controller, connected over a bus 28 to a memory, circuit components or peripheral devices. This bus is a common path for signal transmission, made up e.g. by a data bus, an address bus or a control bus. To the respective devices on the bus 28 are allocated intrinsic addresses (memory addresses or I/O addresses). By specifying the addresses, the CPU 21 is able to communicate with specified devices on the bus 28.

A RAM (random access memory) 22 is a rewritable memory, formed by a volatile memory, such as DRAM (dynamic random access memory), and is used for loading a program code, run by the CPU 21, or for temporarily storing work data by a program being executed.

A ROM (read-only memory) 23 is a read-only memory for permanently storing programs or data. The program codes, stored in the ROM 23, may be exemplified by a self-diagnostic program, sun on power up of the robot apparatus 1, and an operation control program, prescribing the operation of the robot apparatus 1. The control programs for the robot apparatus 1 includes, for example, a 'sensor input/recognition processing program' for recognizing sensor inputs of, for example, a camera 15 or a microphone 16, for recognition thereof as a symbol, an 'behavior control program' for controlling the behavior of the robot apparatus 1, based on the sensor input and the preset behavior control program, as the program takes charge of storage operations, such as short-term storage or long-term storage, as later explained, and a 'driving control program' for controlling the driving of each joint motor or a speech output of the loudspeaker 17 in accordance with the behavior control program.

A non-volatile memory 24 is formed by e.g. an electrically erasable and rewritable memory device, such as EEPROM (electrically erasable and programmable ROM), and is used for non-volatile retention of data which is to be updated sequentially. The data to be updated sequentially may be exemplified by a secret key, other security information and device control programs to be installed after shipment.

An interface 25 is a unit for connection to equipment outside the control unit 20 for enabling data exchange operations. The interface 25 is responsible for data inputting/outputting with e.g. the camera 15, microphone 16 or with the loudspeaker 17. The interface 25 is responsible for data inputting/outputting with e.g. drivers $53_1$ to $53_n$ in the driving unit 50.

The interface 25 may include general-purpose interfaces for connection to peripheral equipment, such as serial interface, e.g. RS (Recommended Standard)-232C, parallel interface, such as IEEE (Institute of Electrical and Electronics Engineers)1284, USB (Universal Serial Bus) interface, i-Link (IEEE 1394) interface, SCSI (Small Computer System Interface) or a memory card interface (card slot) for coping with a PC card or a memory stick, in order to take charge of transferring programs or data with locally connected outside equipment.

In a modification, the interface 25 may be provided with infrared communication (IrDA) interface, in order to have wireless communication with the outside equipment.

The control unit 20 may also include a wireless communication interface 26 or a network interface card (NIC) 27, in order to have proximity wireless data communication, such as Bluetooth, or data communication with variable outside host computers via a wireless network, such as IEEE 802.11b, or over a wide-area network, such as the Internet.

By such data communication between the robot apparatus 1 and the host computer, it is possible to remoter-control or calculate complex behavior control of the robot apparatus 1, with use of remote computer resources.

(B) Method for Controlling the Behavior of the Robot Apparatus

The behavior controlling method for the robot apparatus of the present embodiment is now explained in detail. The robot apparatus 1 may act autonomously responsive to the self state, the surrounding state and to the commands or actions from a user. That is, the robot apparatus 1 may autonomously select and demonstrate the behavior responsive to external stimuli and to the inner states. The robot apparatus 1 selects one or plural component actions, based on the activation level AL for component behaviors and outputs the so selected component behavior to demonstrate the behavior. In the following, the behavior selection control of the behavior control of the robot apparatus 1 up to selection and outputting of the component behavior, demonstrated based on the inner states and the external stimuli, is explained and, first of all, the method for calculating the activation level AL, as a standard for behavior selection, is explained. The overall structure of the control system for the robot apparatus 1 will be explained in detail subsequently.

(1) Behavior Selection Control of the Robot Apparatus

Figure 4:
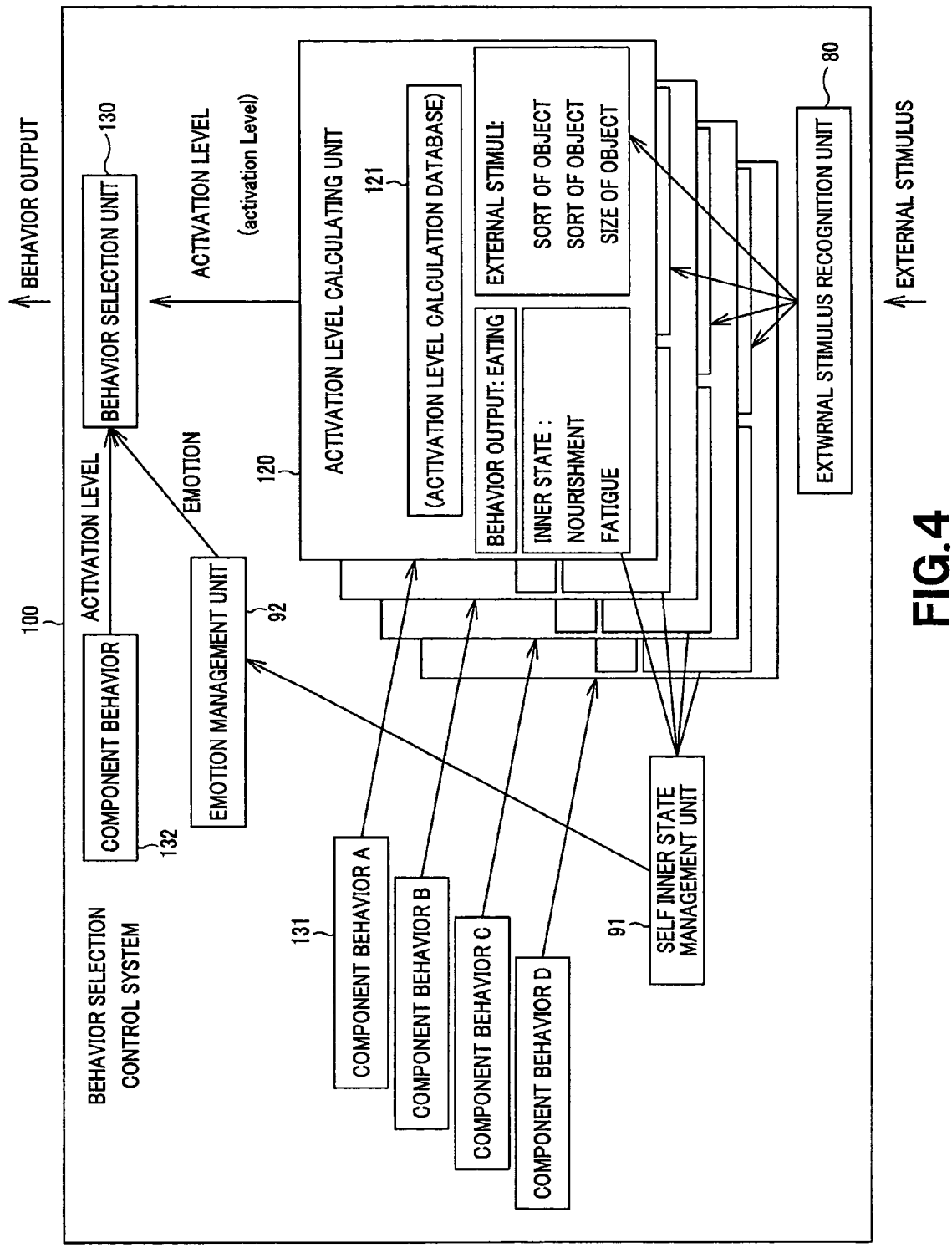
FIG. 4 schematically shows a behavior selecting control system portion of the control system of the robot apparatus for calculating the activation level for each behavior and for outputting the behavior accordingly.

FIG. 4 is a schematic view showing a behavior selection control system of the control system for the robot apparatus 1 performing the processing of acting and outputting based on the activation level AL for respective component behaviors. Referring to FIG. 4, the behavior selection control system 100 includes an external stimulus recognition unit 80 for recognizing external stimuli, such as sensor inputs in the external environment, an inner state management unit 91 for supervising mathematical models of plural sorts of the inner states, such as instinct or feeling of the robot apparatus 1, an emotion management unit 92 for supervising the emotion of the robot apparatus 1, and plural component behaviors 131, as modules, outputting preset behaviors, on selection, based on the inner states and on the external stimuli. In the drawing, only the component behaviors A to D are shown. The behavior selection control system also includes a component behavior 132 (component behavior E), as a module, outputting preset behaviors (later explained), on selection, responsive to the emotion, without regard to the inner states or to the external stimuli, an activation level calculating unit 120 for calculating the activation level AL of each component behavior 131 and a behavior selection unit 130 for selecting the component behaviors 131, 132 demonstrated, based on the activation level AL. The robot apparatus 1 demonstrates an action by the selected component behaviors 131, 132 outputting the behavior.

The external stimulus recognition unit 80 recognizes the perception information of the robot apparatus as the external stimuli, which external stimuli may be enumerated by, for example, the subject information, such as color information, shape information or facial information, processed from a picture input from e.g. a CCD camera 15. Specified examples of the external stimuli include color, shape, face, routine 3D objects, hand gestures, movements, voice, contact, distance, place, time and the number of times of interactions with the user.

The inner state management unit 91 supervises the inner states, such as instinct or pain of the robot apparatus 1. The inner states may be enumerated by e.g. fatigue (FATIGUE), pain (PAIN), nourishment (NOURISHMENT), thirst (THIRST), affection (AFFECTION) or curiosity (CURIOSITY). The inner state management unit 91 is supplied with the information exemplified by the external stimuli, residual quantity of the own battery or the rotational angle of the motor to calculate and supervise the values of the own inner states, having the aforementioned plural inner states as elements (inner state vector IntV). For example, the inner state (state of nourishment) is determined based on the residual quantity of the charging battery 61, while the inner state 'fatigue' may be determined based on the power consumption of the driving unit 50.

The emotion management unit 92 supervises the emotion of the robot apparatus 1, based on the inner states, and notifies the behavior selection unit 130 of the current emotion. The emotion of the robot apparatus 1 is represented on the emotional space having three axes of pleasantness (PLEASANTNESS: P), arousal (AROUSAL: A) and certainty (CERTAINTY: C). The values of the three axes determine the sort and the size of the emotion. Of these, the pleasantness P increases or decreases with increase or decrease of the inner state, and the certainty C increases or decreases with the certainty of the recognition of the robot apparatus 1, while the arousal A is determined by the bio-rhythm of the robot apparatus 1. This bio-rhythm is represented e.g. by the following equation (1):

$$\text{Biorhythm} = a_1 \sin w_1 t + a_2 \sin w_2 t + a_3 \sin w_3 t \quad (1)$$

where t is time and $a_i$, $w_i$ (I=1, 2, 3) are constants.

Figure 5:
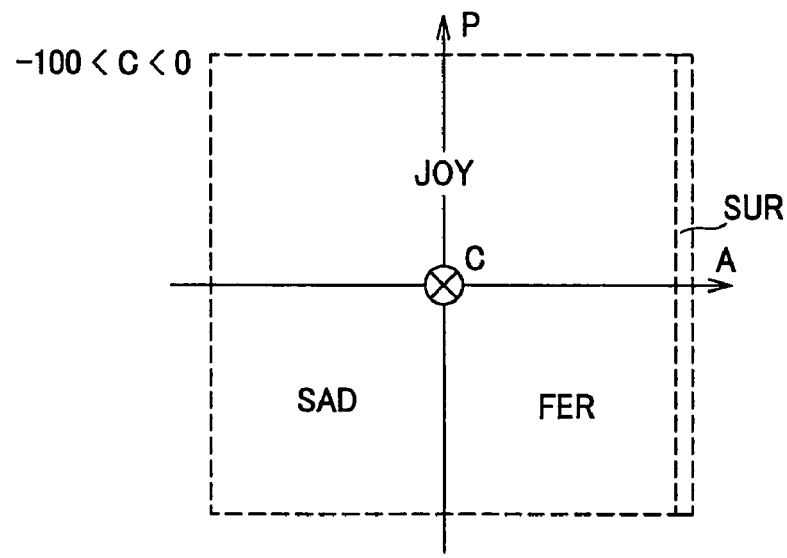
FIG. 5 shows the emotion space for expressing the emotion of the robot apparatus.
Figure 5:
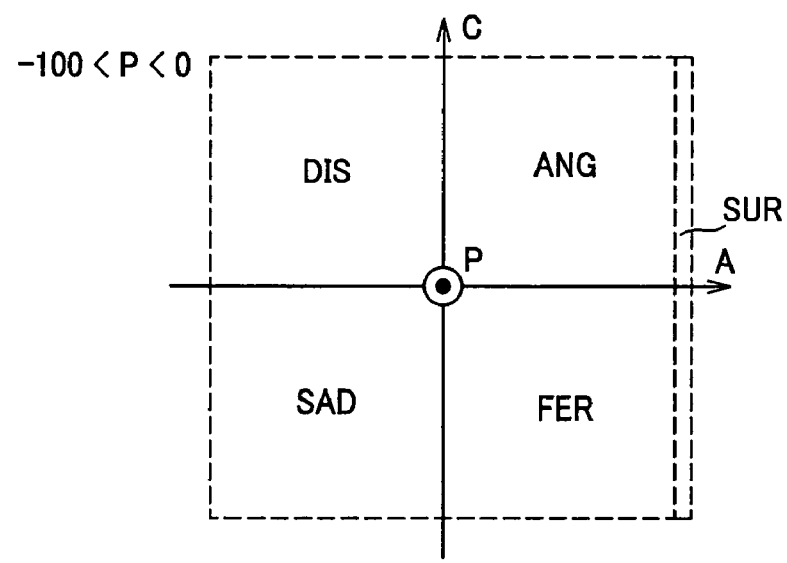

The emotion may be exemplified by joy, sadness (SADNESS), anger (ANGER), surprise (SURPRISE), disgust (DISGUST), fear (FEAR) and neutral (NEUTRAL), associated with areas in the emotion space, as shown in FIG. 5. The vicinity of 0 of each axis represents the emotion of 'neutral'. For example, if $-100<P<0$ and $-100<A<0$, the emotion is sadness (SADNESS). The size of the emotion corresponds to the size on each axis forming the emotional space. For example, the emotion of joy 'JOY' becomes larger the larger the value of pleasantness (P), while the emotion of the sadness 'SADNESS' and fear 'FEAR' becomes larger the smaller the value of pleasantness (P). The size of the other emotions remains constant without regard to the size of the respective axes.

The component behavior 131 (component behaviors A to D) is a module determining the behavior outputs from the inner states and the external stimuli, and provides a state machine for each module. The component behavior classifies the results of recognition of the external information, input to sensors, and demonstrates the behavior on the main body unit of the robot apparatus. This module (behavior describing module) is stated as a schema having a Monitor function for giving a decision on the situation responsive to the external stimuli and to inner states to calculate the activation level AL, and an Action function for realizing status transition attendant on behavior execution (state machine). The schema will be explained in detail subsequently. In each component behavior 131, there are defined preset inner states and the external stimuli, conforming to the component behaviors described therein. Above all, each component behavior 131 is associated with an inner state, out of plural inner states, that can be maintained in a certain gamut by demonstrating the behavior described in the component behavior itself. Stated differently, the behavior described in each component behavior 131 is grasped as a behavior for maintaining the inner state associated with itself to within a certain gamut (also termed a 'homeostatic behavior').

As an example of the component behavior 131, a component behavior A, a behavior output of which is 'eating', handles the sort of the object (OBJECT_D), the size of the object (OBJECT_SIZE) or the distance of the object (OBJECT_DISTANCE), as external stimuli, while handling nourishment 'NOURISHMENT' and fatigue 'FATIGUE' as inner states. In this manner, the sorts of the external stimuli and the inner states are defined from one component behavior 131 to another, and the activation level AL for the behavior (component behavior) associated with the relevant external stimuli and inner states is calculated. If, in this case, the 'state of nourishment' and the 'fatigue' exceed the specified gamut, such an activation level AL which will facilitate selection of the component action A is calculated for maintaining the inner state to within the specified gamut. This achieves homeostasis of the robot apparatus 1. Meanwhile, an inner state or an external stimulus may, of course, be associated not only with the sole component behavior 131 but also with plural component behaviors 131.

On the other hand, the component behavior 132 (component behavior E) is a module determining a behavior output irrespective of the inner state and the external stimuli. This module (behavior describing module) is described as a schema calculating a constant activation level AL at all times. In contradistinction from the component behavior 131, described above, this component behavior 132 is not associated with the inner state of the robot apparatus 1. Thus, the behavior stated in the component behavior 132 is comprehended as a behavior not aimed to maintain the inner state of the robot apparatus 1 to within a preset gamut (also termed a non-homeostatic behavior). Meanwhile, the component behavior 132 outputs a behavior consistent with the emotion of the robot apparatus 1 supervised by the emotion management unit 92, as will be explained subsequently.

It is noted that the activation level AL, calculated by the component actions 131, 132, is a measure indicating how the robot apparatus 1 is desirous to execute the component action (priority of execution). When the behavior selection unit 130 selects the component action, based on this activation level AL, the component action selected outputs a behavior stated therein. Although the component action 132 calculates the constant activation level AL at all times, the component action 131 calculates the activation level AL, by the activation level calculating unit 120, based on the inner states and the external stimuli associated with the component action.

The activation level calculating unit 120 refers to an activation level calculating database 121, as later explained, in which the input external stimuli are associated with the change in the inner state anticipated to occur after behavior demonstration, to calculate the activation level AL for each of the component behaviors A to D at a time point, from the external stimuli and the inner states at the time point. In the present embodiment, this AL calculating unit 120 is provided for each schema. Alternatively, the activation level may be calculated for the totality of the component behaviors by a sole AL calculating unit.

The Activation level AL for each component behavior is calculated from the instinct value for each behavior, conforming to each current own inner state, the degree of satisfaction, which is based on the current own inner state, and from the anticipated change in the degree of satisfaction, indicating the amount of change of the inner state, anticipated to take place by external stimuli, that is, the amount of change of the inner state, anticipated to take place as a result of inputting of the external stimuli and ensuing behavior demonstration.

Here, such an example is explained, in which, as a specified example of calculating the Activation level AL, an object of a certain 'sort' and 'size' is at a certain 'distance', the activation level AL of a schema, the behavior output of which is 'eating', is calculated from the 'state of nourishment' and 'fatigue' as inner states.

(2) Activation Level Calculating Unit

Figure 6:
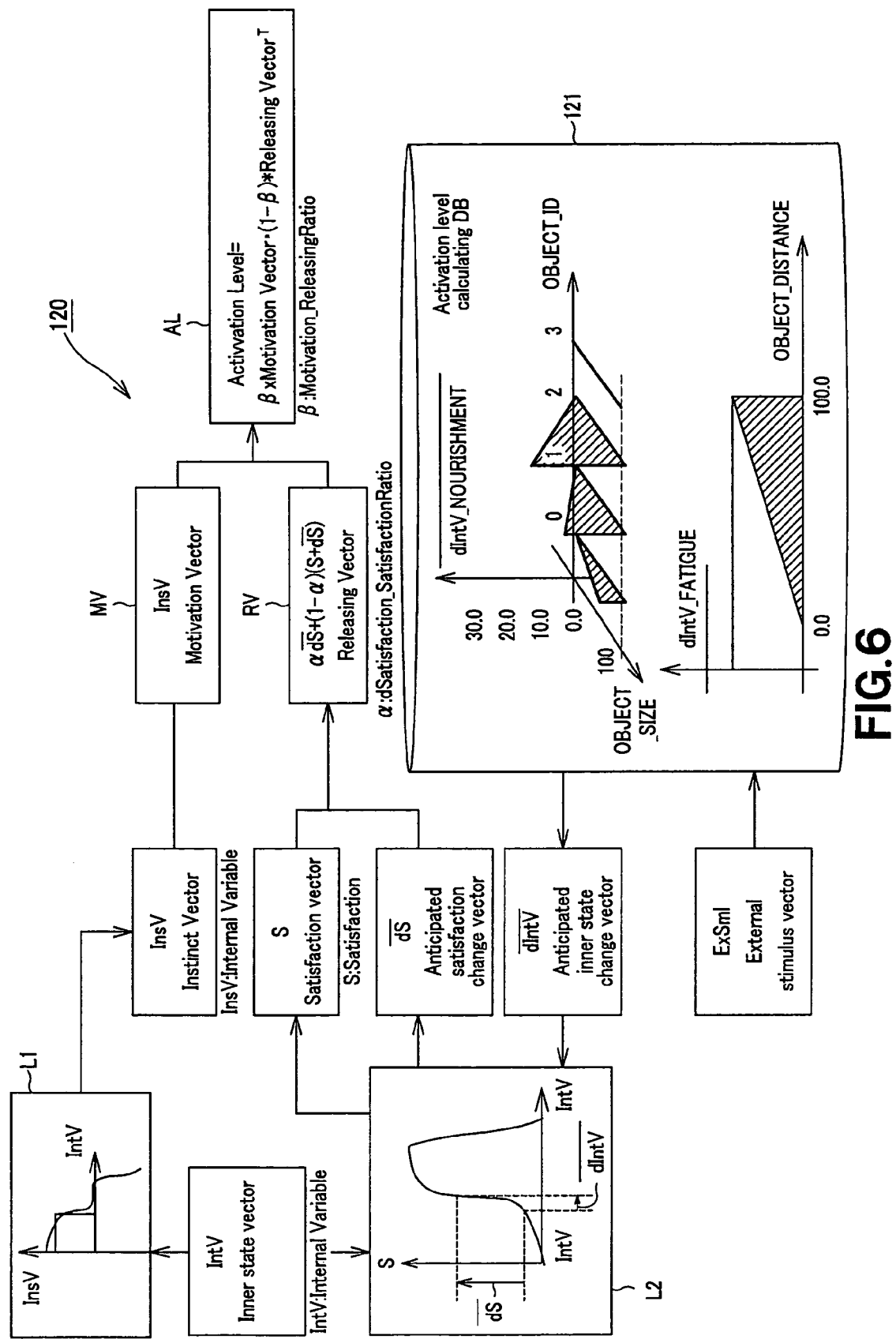
FIG. 6 schematically shows the processing flow for calculating the activation level AL by the activation level calculating unit from the external stimuli and the changes in the inner states.

FIG. 6 schematically shows the processing flow for the activation level calculating unit 120 to calculate the activation level AL from the inner state and from the external stimuli. In the present embodiment, the inner state vector IntV (internal variable), having one or more inner state as a component, is defined for each component behavior, and the inner state vector IntV conforming to each component behavior is obtained from the inner state management unit 91. That is, each component of the inner state vector IntV indicates the value of a sole inner state (inner state parameter) and each component of the inner state vector IntV is used for calculating the activation level of the component behavior. For example, for the schema having the behavior output 'eating', the inner state vector IntV {IntV_NOURISHMENT, Int_Fatigue'} is defined.

For each inner state, an external stimulus vector ExStml (external stimulus) having one or more external stimuli is defined. From the recognition unit 80, the external stimulus vector ExStml, conforming to each inner state, that is, each component behavior, is obtained from the recognition unit 80. The respective components of the external stimulus vector ExStml indicate the information of recognition, such as the size or sort of the object or the distance to the object, and each component of the external stimulus vector ExStml is used for computing the inner state for which the component is defined. Specifically, the external stimulus vector ExStml {OBJECT_ID 'sort of the object', OBJECT_SIZE 'size of the object'} is defined for the inner state IntV_NOURISHMENT, while the external stimulus vector ExStml {OBJECT_DISTANCE 'distance to object'} is defined for the inner state IntV_Fatigue.

The activation level calculating unit 120 is supplied with this inner state vector IntV and the external stimulus vector ExStml to calculate the Activation level AL. Specifically, the activation level calculating unit 120 includes a motivation vector calculating unit MV for finding, from the inner state vector IntV, a motivation vector (MotivationVector) as a measure indicating how much the robot apparatus is interested in carrying out a relevant component behavior, and a releasing vector calculating unit RV for finding, from the inner state vector IntV and from the external stimulus vector ExStml, a releasing vector (ReleasingVector) and calculates the activation level AL from these two vectors.

(2-1) Calculation of Motivation Vector

The motivation vector, as one element for calculating the activation level AL, may be found from the inner state vector IntV defined in the component behavior as instinct value vector InsV (Instinct Variable) indicating the desire for the component behavior. For example, the component behavior A, having a behavior output 'eating', has the inner state vector IntV {IntV_NOURISHMENT and IntV_FATIGUE} from which the instinct value vector InsV {InsV_NOURISHMENT and InsV_FATIGUE} is found as the motivation vector. That is, the instinct value vector InsV becomes the motivation vector for calculating the Activation level AL.

As a method for calculating the instinct value vector InsV, such a function may be used in which the larger the value of the inner state vector IntV, the smaller becomes the instinct value, with the judgment that the instinct is satisfied, and in which, when the inner state vector IntV becomes larger than a certain value, the instinct value becomes negative.

Figure 7:
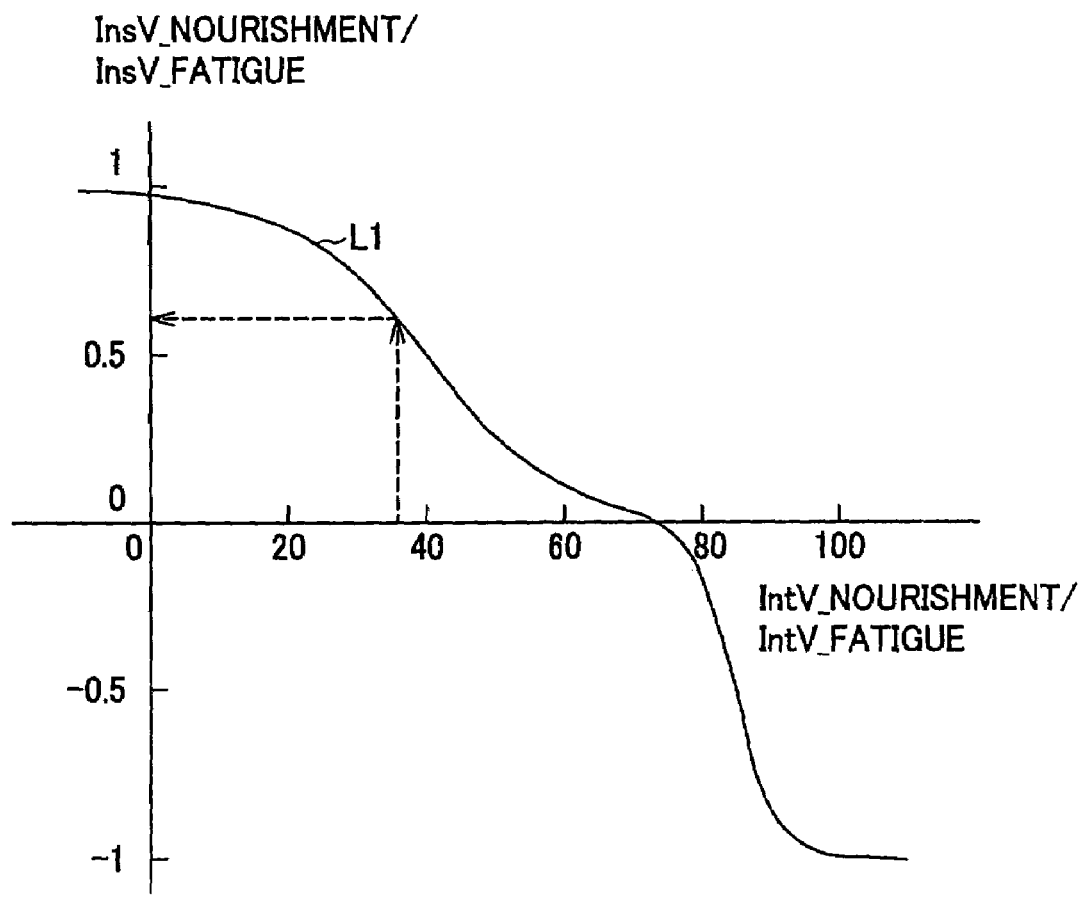
FIG. 7 is a graph showing the relation between the inner state and the instinct, taking respective components of the inner state vector IntV and respective components of the instinct vector on the abscissa and on the ordinate, respectively.

Specifically, the function of the following equation (2):

$$InsV = \frac{1}{1 + \exp(-(A \cdot IntV - B)/C)} + \frac{1}{1 + \exp((D \cdot IntV - E)/F)} \quad (2)$$

where
IntV: the inner state vector
InsV: the instinct value vector
A to F: constants, and shown in FIG. 7, may be used. FIG. 7 shows the relation between the inner state and the instinct value shown by the equation (1), in which components of the inner state vector IntV and components of the instinct value vector InsV are plotted on the abscissa and on the ordinate, respectively.

The instinct value vector InsV is determined solely by the value of the inner state vector IntV, as shown by the equation (1) and by FIG. 7. Here, such a function is shown in which the size of the inner state is 0 to 100 and the size of the instinct value is −1 to 1. For example, the robot apparatus is able to select the behavior so as to maintain the inner state of 80% at all times if, when the inner state of 80% is met, the inner state-instinct value curve L1 is set so as to yield the instinct value equal to 0. This indicates that, in case the instinct corresponding to the inner state 'state of nourishment' (IntV_NOURISHMENT) is the 'appetite' (InsV_NOURISHMENT), the appetite is increased and becomes zero when the apparatus is hungry and when the apparatus has eaten only moderately, respectively. In this manner, such a behavior may be demonstrated which will exhibit such appetite state.

By varying the constants A to F in the above equation, the instinct values, variable with the inner states, may be found. For example, the instinct value may be changed between 1 and 0 for the inner states from 0 to 100. Alternatively, there may be provided an inner state-instinct value function, different from the above equation, may be provided for each inner state.

(2-2) Calculation of Releasing Vector

On the other hand, the releasing vector, as the other element for calculating the activation level AL, may be calculated from the satisfaction vector S (Satisfaction) found from the inner state vector IntV, and from the anticipated satisfaction change vector as found from the external stimulus vector ExStml.

First, the anticipated inner state change vector, represented by the following equation (3):

$$d\overline{IntV} = \{d\overline{IntV\_NOURISHMENT}, d\overline{IntV\_FATIGUE}\} \quad (3)$$

where $d\overline{IntV}$: anticipated inner state change vector $d\overline{IntV\_NOURISHMENT}$: anticipated change of the inner state 'state of nourishment'

$d\overline{IntV\_FATIGUE}$: anticipated change of the inner state 'fatigue' with the anticipated inner state change vector indicating the difference between the anticipated inner state and the current inner state, which may be obtained after behavior demonstration, is found from the inner state defined in each component behavior and from the external stimulus defined in this inner state.

The anticipated inner state change vector represents a change from the current inner state vector as anticipated after behavior demonstration, and may be found by the activation level calculating unit 120 referring to the AL calculating database 121 to which the AL calculating unit may have reference. In the AL calculating database 121, there is stated the correspondence between the external stimulus vector and the inner state change vector, as anticipated after behavior demonstration. By referring to the data of the AL calculating database 121, the activation level calculating unit 120 is able to acquire the anticipated inner state change vector conforming to the input external stimulus vector.

The anticipated inner state change vector, stored in the AL calculating database 121, will be explained in detail subsequently. Here, the method for finding the anticipated inner state and the anticipated instinct value change from the AL calculating database is first explained.

Figure 8A:
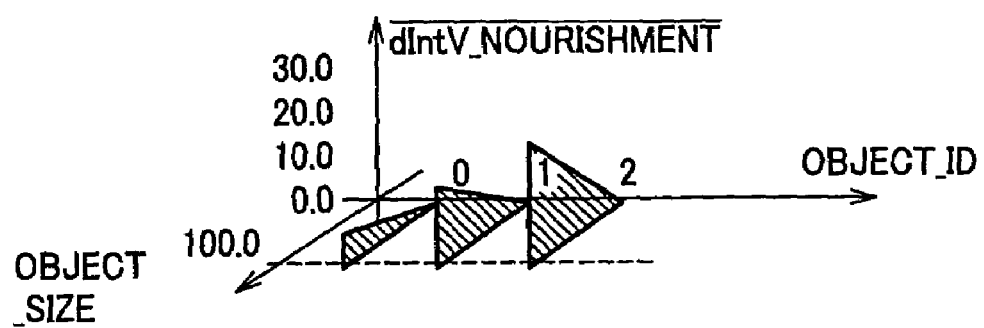
FIG. 8 shows calculated data of the activation level in an activation level calculating database.
Figure 8B:
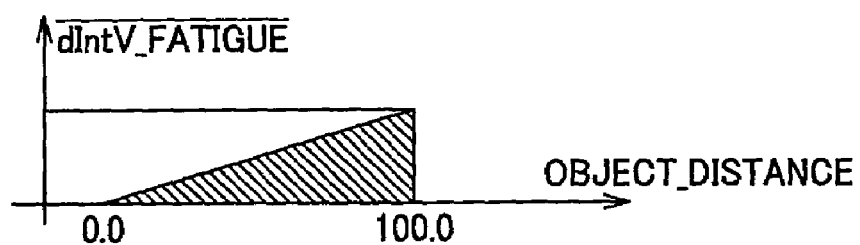

As activation level calculating data, registered in the AL calculating database 121, those shown in FIGS. 8a and 8b may be contemplated. FIG. 8a shows a case in which, insofar as the inner state 'nourishment' (NOURISHMENT) is concerned, as the size of the object (OBJECT_SIZE) is increased, an object M2 corresponding to the object sort (OBJECT_ID) of OBJECT_ID=1 will need a larger quantity than an object M1 corresponding to the object sort (OBJECT_ID) of OBJECT_ID=0, while an object M3 corresponding to the object sort (OBJECT_ID) of OBJECT_ID=2 will need a larger quantity than the object M2 corresponding to the object sort (OBJECT_ID) of OBJECT_ID=1, as a result of demonstration of the component behavior 'eating', it may be conjectured that the inner state 'state of nourishment' is met in a larger quantity, and the robot apparatus will be tired correspondingly.

Referring to FIG. 8b, there is shown a case in which, as regards the inner state 'fatigue', the larger the distance of the object 'OBJECT_DISTANCE', the larger is the anticipated quantity met of the inner state 'FATIGUE' and the more the robot apparatus is anticipated to be tired, as a result of demonstration of the component behavior 'eating'.

That is, given the above-mentioned definition of the inner state vector IntV and the external stimulus vector ExStml for each component behavior, if a vector having the object size and the object sort as components of the external stimulus vector ExStml is supplied, an anticipated inner state change for the result of the behavior of the component behavior A associated with the inner state vector having, as component, the inner state IntV_NOURISHMENT (state of nourishment), for which the external stimulus vector ExStml is defined, is found and, if a vector having a distance to the object is supplied, an anticipated inner state change for the result of the behavior of the component behavior A, for which is defined the inner state vector IntV_FATIGUE ('fatigue'), for which the external stimulus vector ExStml is defined, is found.

Then, from the inner state vector IntV, the satisfaction vector S, indicated by the equation (4):

$$S = \{S\_NOURISHMENT, S\_FATIGUE\} \quad (4)$$

where

S: satisfaction vector

S_NOURISHMENT: satisfaction for the inner state 'state of nourishment'

S_FATIGUE: satisfaction for the inner state 'fatigue' is calculated, and the anticipated satisfaction change vector, shown in the equation (5):

$$d\overline{S} = \{dS\_NOURISHMENT, dS\_FATIGUE\} \quad (5)$$

where $d\overline{S}$: anticipated satisfaction change vector $dS\_NOURISHMENT$: anticipated change in the satisfaction for inner state 'state of nourishment'

$dS\_FATIGUE$: anticipated change in the satisfaction for inner state 'fatigue' is found from the anticipated inner state change vector, shown by the above equation (3).

As a method for calculating the satisfaction vector S for the inner state vector intV, the functions indicated by the following equations (6-1) and (6-2):

$$\text{Satisfaction(NOURISHMENT)} = \quad (6\text{-}1)$$
$$-1 + \frac{1}{1 + \exp(-(A \cdot IntV - B)/C)} + \frac{1}{1 + \exp((D \cdot IntV - E)/F)}$$

$$\text{Satisfaction(FATIGUE)} = \quad (6\text{-}2)$$
$$-1 + \frac{1}{1 + \exp(-(A \cdot IntV - B)/C)} + \frac{1}{1 + \exp((D \cdot IntV - E)/F)}$$

where

A to F: constants may be used for the components IntV_NOURISHMENT and IntV_FATIGUE of the inner state vector {IntV_NOURISHMENT, IntV_FATIGUE} defined in the component behavior A.

Figure 9:
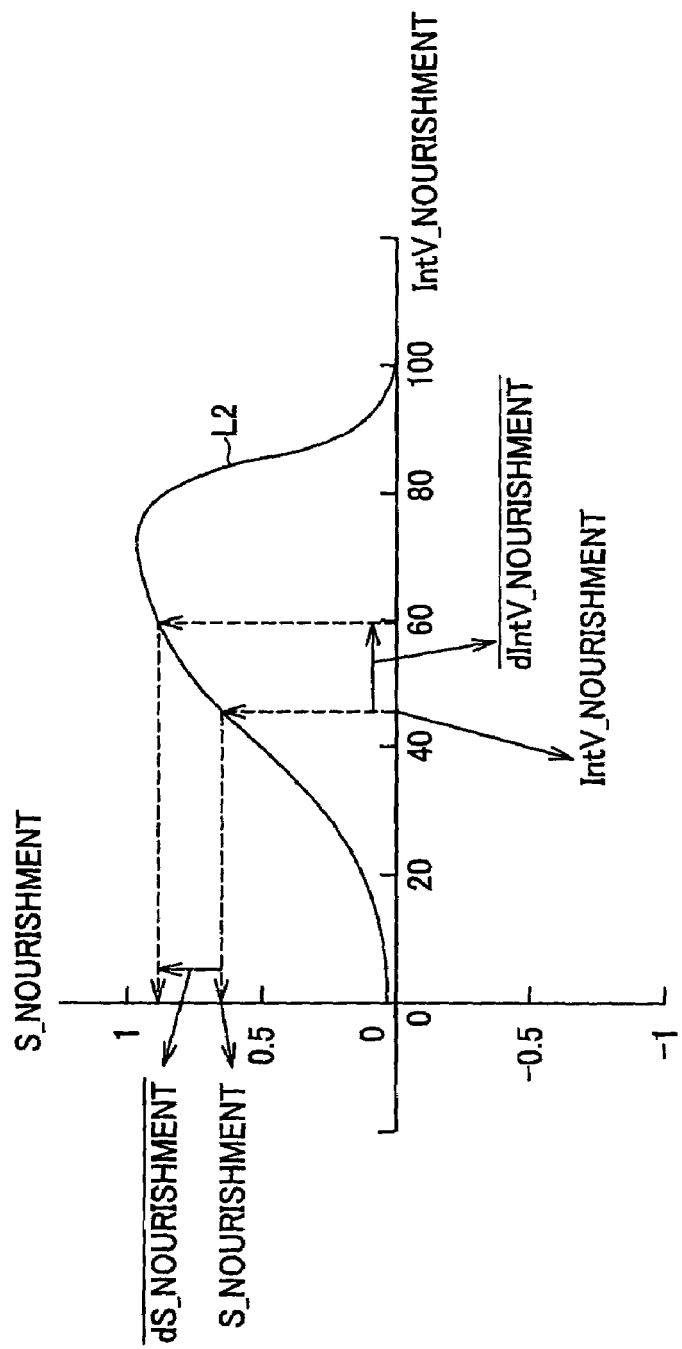
FIG. 9 is a graph showing an example of the relation between the inner state and the satisfaction.
Figure 10:
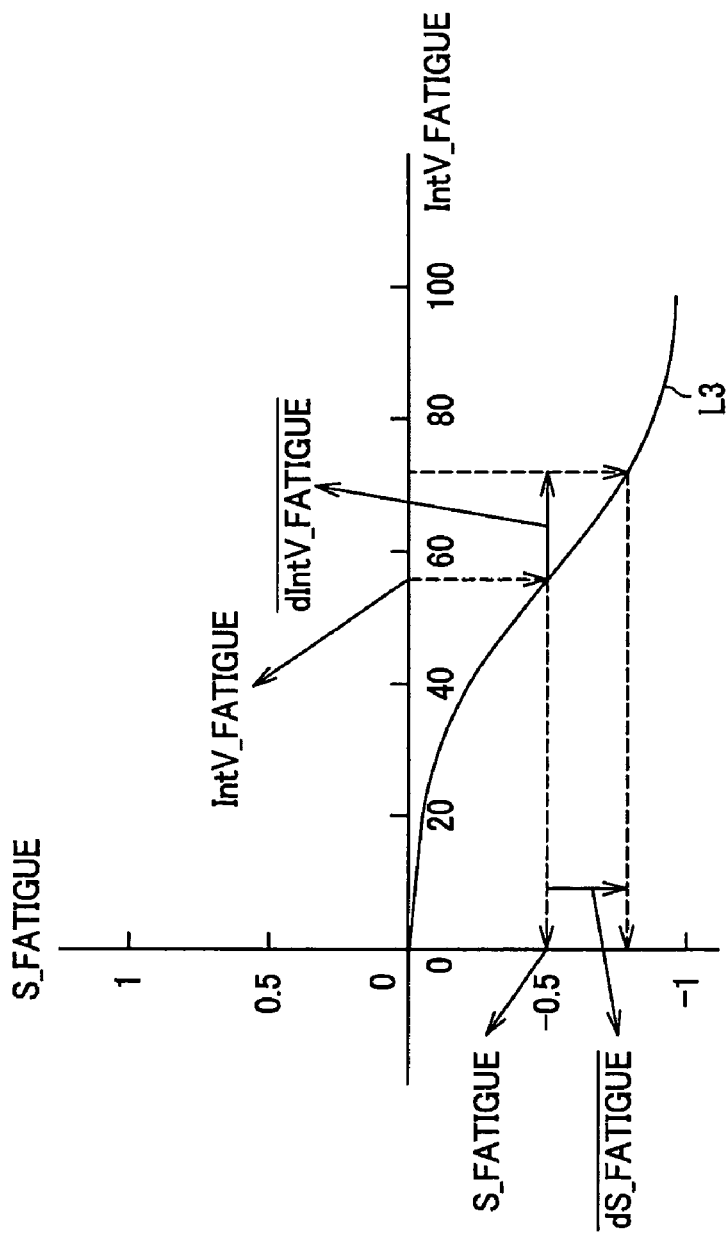
FIG. 10 is a graph showing another example of the relation between the inner state and satisfaction.

FIGS. 9 and 10 are graphs showing the functions represented by the above equations (6-1) and (6-2), respectively. Specifically, FIG. 9 is a graph showing the relation between the inner state and satisfaction, in which the inner state IntV_NOURISHMENT (state of nourishment) is plotted on the abscissa and the satisfaction S_NOURISHMENT for the inner state (state of nourishment) is plotted on the ordinate, and FIG. 10 is a graph showing the relation between the inner state and satisfaction, in which the inner state IntV_FATIGUE (fatigue) is plotted on the abscissa and the satisfaction S_FATIGUE for the inner state (fatigue) is plotted on the ordinate.

The function shown in FIG. 11 is a function of a curve L2 in which the value IntV_NOURISHMENT of the inner state (state of nourishment) has a value between 0 and 100 and the corresponding satisfaction S_NOURISHMENT has positive values from 0 to 1, and in which the satisfaction increases from 0 for the values of the inner state from 0 to approximately 80, then decreases and again becomes equal to 0 for the value of the inner state equal to 100. That is, as regards the inner state (state of nourishment), both the satisfaction S_NOURISHMENT, calculated from the current value (at a certain time) of the inner state 'state of nourishment' (IntV_NOURISHMENT=4.0) and the anticipated change of satisfaction corresponding to the anticipated change of the inner state 'state of nourishment' obtained from FIG. 8a (2.0 of from 4.0 to 6.0), are both positive.

Although FIG. 6 shows only the curve L2, the function shown in FIG. 10 may also be used as the relation between the inner state and the satisfaction. That is, the function shown in FIG. 10 is a function showing a curve L3 in which the value IntV_FATIGUE of the inner state 'fatigue' has a value form 0 to 100, the satisfaction corresponding thereto has all negative values from 0 to −1 and in which the larger the inner state, the smaller becomes the satisfaction. The satisfaction S_FATIGUE, calculated from the value of the current inner state 'fatigue', is negative and, if the anticipated change in the inner state of the inner state 'fatigue' obtained from FIG. 8a is positive, the anticipated change vector of the satisfaction is negative.

By variably setting the constants A to F in the functions of the equations (6-1) and (6-2), it is possible to set a function for obtaining different values of satisfaction in association with various inner states.

The value representing to which extent the inner state is to be satisfied after behavior demonstration by the external stimulus may be determined by the equation (7):

$$\text{ReleasingVector} = \alpha \cdot d\overline{S} + (1-\alpha)(S+d\overline{S}) \quad (7)$$

where $\alpha$:$d\overline{S}/S$ ratio $d\overline{S}$: anticipated satisfaction change vector $S+d\overline{S}$: anticipated satisfaction vector to find the releasing vector as the other element for calculating the Activation level AL.

If $\alpha 1$ in the equation (7) is large, the releasing vector depends strongly on the change in the anticipated change in the satisfaction, that is, on a value indicating which satisfaction is obtained, or by which value the satisfaction is increased, as a result of the behavior demonstration. If conversely the value of $\alpha 1$ is small, the releasing vector depends strongly on the anticipated satisfaction, that is, on a value indicating which is the value of satisfaction on behavior demonstration.

(2-3) Calculation of Activation Level AL

From the motivation vector, found as described above, and from the releasing vector, found as described above, the activation level AL may ultimately be found by the equation (8):

$$\text{ActivationLevel} = \beta \text{MotivationVector} \cdot (1-\beta) \text{ReleasingVector}^T \quad (8)$$

where $\beta$:Motivation/Releasing ratio

If $\beta 1$ is large or small, the activation level AL tends to depend strongly on the inner state (instinct) and on the external stimulus (anticipated change in satisfaction and anticipated satisfaction), respectively. It is possible in this manner to calculate the instinct, satisfaction and anticipated satisfaction from the value of the inner state (inner state vector IntV) and from the value of the external stimulus (external stimulus vector ExStml) to calculate the activation level AL based on the instinct, satisfaction and anticipated satisfaction.

(2-4) Activation Level Calculating Database

The structure of data stored in the AL calculating database 121 and the method for referring to the database (method of finding the anticipated change in the inner state) are hereinafter explained. The activation level calculating data are data for finding the anticipated inner state change vector against an input external stimulus, as mentioned previously, and representative points (values of the external stimulus) are defined on the external stimulus vector space, against the inner states defined on the component behaviors. The anticipated change in the inner state, indicating the anticipated change in the inner state, are defined on the representative points. In case the input external stimulus is of a value on a representative point on the defined external stimulus vector space, the anticipated change in the inner state is of a value defined on the representative point.

Figure 11A:
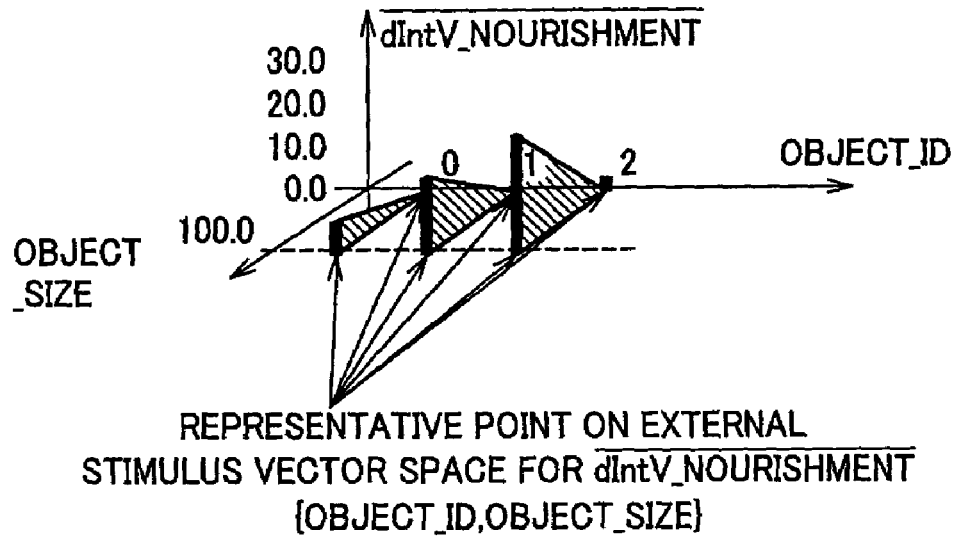
FIGS. 11a and 11b show examples of the activation level computing data structure in case of finding anticipated changes in the inner states 'state of nourishment' (NOURISHMENT) and 'fatigue' (FATIGUE), respectively.
Figure 11B:
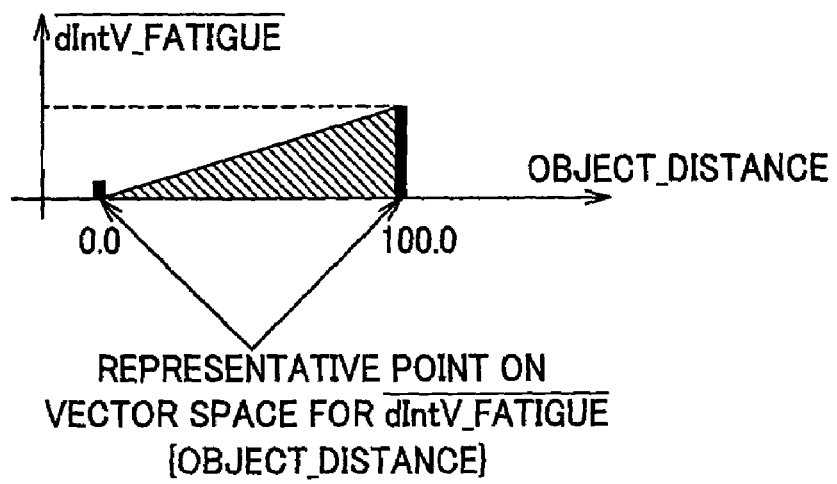

FIGS. 11a and 11b are charts showing an example of a data structure for calculating the activation level. Referring to FIG. 11a, if the anticipated change in the inner state of the inner state 'state of nourishment) ('NOURISHMENT') is to be found, representative points {OBJECT_ID and OBJECT_SIZE} on the external stimulus vector space and the anticipated change in the inner state corresponding to these representative points, are defined as shown for example in Table 1:

TABLE 1

| External stimulus vector {OBJECT_ID, OBJECT_SIZE} | Anticipated Change in inner state IntV_NOURISHMENT |
|---|---|
| {0, 0.0} | 0.0 |
| {0, 100.0} | 10.0 |
| {1, 0.0} | 0.0 |
| {1, 100.0} | 20.0 |
| {2, 0.0} | 0.0 |
| {2, 100.0} | 30.0 |

If, as shown in FIG. 11b, the anticipated inner state change vector of the inner state 'fatigue' ('FATIGUE') is to be found, a representative point on the external stimulus vector space {OBJECT_DISTANCE} and the anticipated change in the inner state change associated with this representative point are defined for example as shown in the following Table 2:

TABLE 2

| External stimulus vector {OBJECT_ID, OBJECT_SIZE} | Anticipated Change in inner state IntV_FATIGUE |
|---|---|
| {0.0} | 0.0 |
| {100.0} | 20.0 |

Since the anticipated change in the inner state is defined only on the representative point on the external stimulus vector space, it may be an occurrence that a value other than the representative point on the external stimulus vector space is input, depending on the sort of the external stimulus (such as, for example, OBJECT_DISTANCE or OBJECT_SIZE). In such case, the anticipated change in the inner state is found by linear interpolation from the representative points in the vicinity of the input external stimulus.

Figure 12:
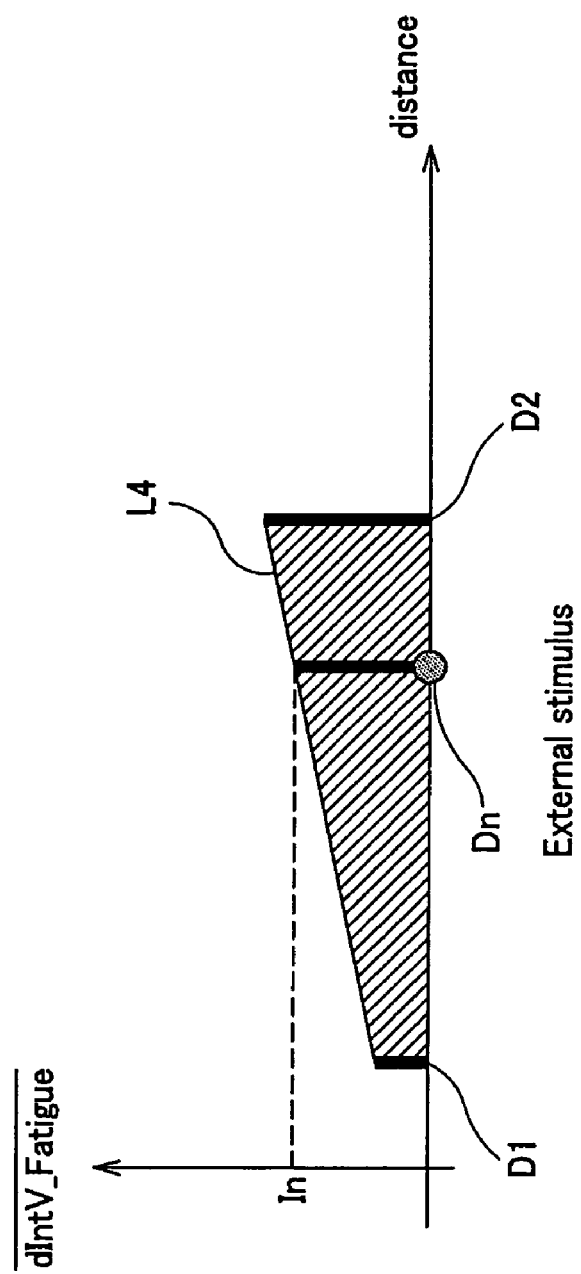
FIG. 12 illustrates a method for linear interpolation of one-dimensional external stimuli.
Figure 13:
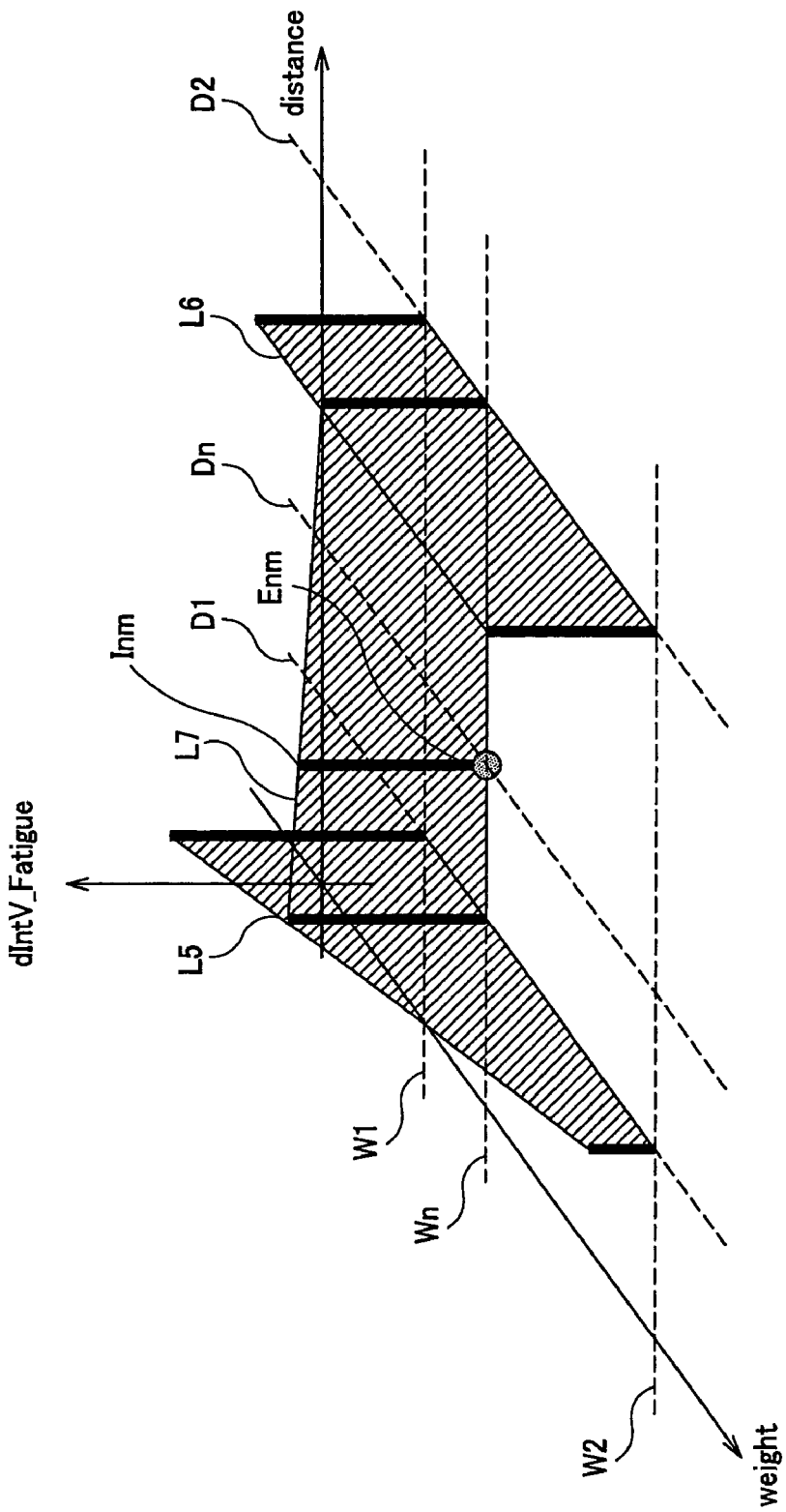
FIG. 13 illustrates a method for linear interpolation of two-dimensional external stimuli.

FIGS. 12 and 13 illustrate the method for linear interpolation of the one-dimensional and two-dimensional external stimuli. In case of finding the anticipated change in the inner state from the sole external stimulus (OBJECT_DISTANCE) as shown in FIG. 11b, that is, in case a sole external stimulus has been defined in the inner state, the external stimulus is plotted on the abscissa and the anticipated change in the inner state for this external stimulus is plotted on the ordinate. The anticipated change in the inner state In of the input external stimulus Dn may then be found by a straight line L4 which will give the anticipated change in the inner state as defined by the representative points D1 and D2 as parameters of the external stimulus (OBJECT_DISTANCE).

If, as shown in FIG. 13, the external stimuli, entered to the inner state, are defined as external stimulus vector composed of two components, OBJECT_WEIGHT is defined in addition to the OBJECT_DISTANCE shown in FIG. 12, representative points (D1, W1), (D1, W2), (D2, W1) and (D2, W2) are defined as preset parameters of the external stimuli, there being corresponding anticipated change in the inner state, and an external stimulus Enm(Dn, Wn) different from the above four representative points have been entered, a straight line L5 passing through the anticipated change in the inner state as defined by the representative points W1, W2 of the OBJECT_WEIGHT is found for OBJECT_DISTANCE=D1, and a straight line L6 passing through the anticipated change in the inner state as defined by the representative points W1, W2 of the OBJECT_WEIGHT is found for OBJECT_DISTANCE=D2. The anticipated change in the inner state for the two straight lines L5 and L6 for e.g. Wn, out of two inputs of the input external stimuli Enm, is found, a straight line L7 interconnecting these two anticipated changes in the inner state is found, and the anticipated change in the inner state corresponding to the other external stimulus Dn of the input external stimulus in the straight line L7 is found to find the anticipated change in the inner state corresponding to the external stimulus Enm by linear interpolation.

(3) Control System for Robot Apparatus

Figure 14:
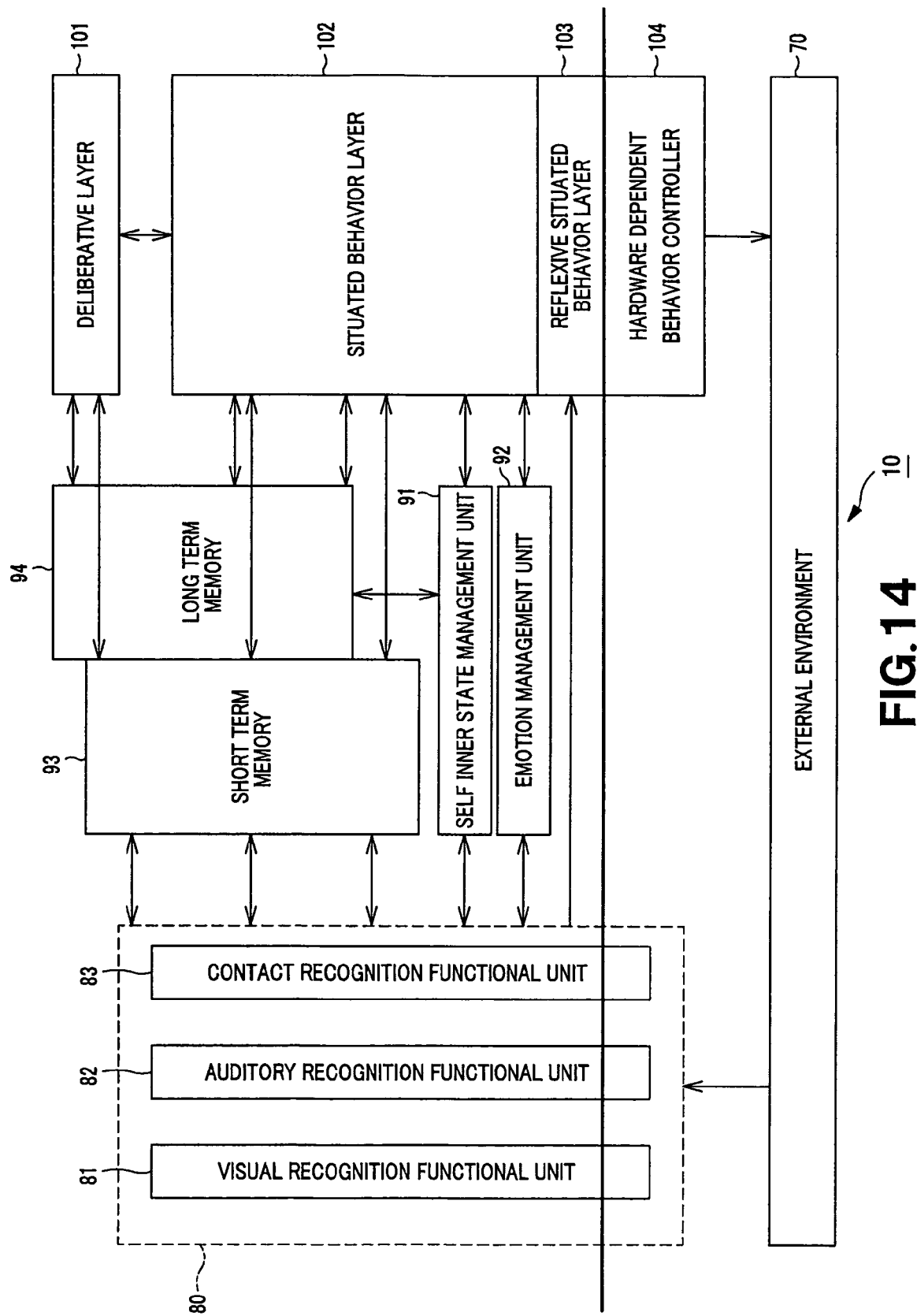
FIG. 14 schematically shows the functional configuration of the behavior control system of the robot apparatus.

A specified example of adapting the behavior selection control system, calculating the aforementioned activation level AL to output a behavior to the control system of the robot apparatus is now explained in detail. FIG. 14 depicts the functional configuration of a control system 10 for the above-described behavior selection control system 100. The robot apparatus 1 of the present embodiment is able to exercise behavior control responsive to the result of recognition of the external stimulus and to the change in the inner status. In addition, the robot apparatus 1 includes a long term storage function and is able to perform associative storage of the change in the inner state from the external stimulus to exercise behavior control responsive to the results of recognition of the external stimuli and to changes in the inner state.

The above-described behavior selection control system 100 may be mounted on the control system 10 by adopting the object-oriented programming. In this case, each software is handles in terms of a module as a unit. The module, termed an 'object', is composed of data and a processing procedure for the data. each object is able to deliver and invoke data by an object-to-object communication method employing message communication and a co-owned memory.

For recognizing an external environment 70, the behavior control system 10 includes an external stimulus recognition unit 80, shown in FIG. 4, including a visual recognition functional unit 81, an auditory recognition functional unit 82 and a contact recognition functional unit 83.

The recognition functional unit 81 performs picture recognition processing, such as face recognition or color recognition, and feature recognition, based on a captured image, entered via a picture input device, such as a CCD (charge-coupled device).

The auditory recognition functional unit 82 performs speech recognition, entered via a speech input device, such as a microphone 16, to extract features or to recognize a word set (text).

The contact recognition functional unit 83 recognizes sensor signals by a contact sensor, enclosed e.g. in a head of the main body unit, to recognize the external stimuli, such as 'stroked' or 'patted'.

A status management unit 91 supervises several sorts of the emotion, such as instinct or feeling, in the form of a mathematical model, and supervises the inner states, such as instinct or emotion of the robot apparatus 1, responsive to the external stimuli (ES: ExternalStimula) recognized by the visual recognition functional unit 81, auditory recognition functional unit 82 and the contact recognition functional unit 83. The feeling model and the instinct model (feeling-instinct model) are each provided with a result of recognition and a behavior hysteresis, as inputs, and supervise the feeling values and the instinct values. The behavior model may refer to the feeling values and the instinct values.

The emotion management unit 92 classifies the emotion of the robot apparatus 1 into e.g. joy, sadness, anger, surprise, disgust, fear and neutral, and supervises the so classified emotion.

There are also provided, for performing behavior control responsive to the results of recognition of the external stimuli or to changes in the inner state, a short term memory (STM) 93 for short-term storage which is lost as time elapses, and a long term memory (LTM) 94 for storage of the information for longer time. The classification of the storage mechanism by short-term storage and long-term storage is derived from neuropsychology.

The short term memory 93 is a functional module for holding, for a short period of time, a target or an event recognized from the external environment by the aforementioned visual recognition functional unit 81, auditory recognition functional unit 82 and by the contact recognition functional unit 83. For example, the short term memory holds an input image from e.g. the camera 15 shown in FIG. 2 for a shorter time of approximately 15 seconds.

The long term memory 94 is used for long-term storage of the information obtained on learning, such as names of objects. The long term memory 94 is able to hold changes from the external stimuli to inner states in a behavior describing module by associative storage.

The behavior control of the present robot apparatus 1 is roughly divided into a 'reflexive behavior' implemented by an behavior unit (reflexive situated behavior layer) 103, a 'situation dependent behavior' implemented by a situation-dependent behavior layer (situated behavior layer or SBL) 102, and a 'deliberative behavior' implemented by a deliberative behavior layer (deliberative layer) 101.

The reflexive situated behavior layer 103 is a functional unit for implementing a reflexive movement of the main body unit responsive to the external stimuli recognized by the visual recognition functional unit 81, auditory recognition functional unit 82 and the by contact recognition functional unit 83. The reflexive behavior basically depicts a behavior directly receiving the results of recognition of the external information input by sensors and classifying the received results of recognition to directly determine the output behavior. For example, the gesture of following the face of a human being or nodding is preferably mounted as a reflexive behavior.

The situated behavior layer 102 is equivalent to the component behaviors 131, 132, activation level calculating unit 120 and to the behavior selection unit 130 in the behavior selection control system 100 shown in FIG. 4, and calculates the activation level AL from the inner states and the external stimuli as described above to perform behavior output accordingly. Specifically, the situated behavior layercontrols the behavior consistent with the current status of the robot apparatus 1, based on the stored contents of the short term memory 93 and the long term memory 94, the inner state of the robot apparatus 1, supervised by the inner state management unit 91, or the emotion of the robot apparatus 1 supervised by the emotion management unit 92.

The situated behavior layer 102 is provided with a state machine for each component behavior 131 (component behaviors A to D) and classifies the results of recognition of the external information as input by the sensor to demonstrate the behavior on the main body unit. The situated behavior layer 102 also implements a behavior for maintaining the inner states within a preset gamut (also termed a homeostatic behavior) and, when the inner state has exceeded the designated gamut, activates the behavior of restoring the inner state to be within the gamut to facilitate its demonstration. In actuality, such behavior is selected which takes both the inner state and the external environment into account. The situation dependent behavior is slower in reaction time than the reflexive behavior.

The deliberative layer 101 carries out e.g. a behavior schedule of the robot apparatus 1 for a longer period of time, based on the stored contents of the short term memory 93 and the long term memory 94. The deliberative behavior depicts an inference or a behavior carried out after mapping out a plan for realization of the inference. For example, the searching of a route from the position of the robot apparatus and the target position is the deliberative behavior. Since the inference or plan is likely to necessitate longer processing time or a larger computational load than the reaction time for the robot apparatus 1 to maintain the interaction, the deliberative behavior executes inference or planning as the aforementioned reflexive behavior or the situation-dependent behavior returns the reaction in real-time.

The deliberative layer 101, situated behavior layer 102 and the reflexive situated behavior layer 103 may be described as an upper application program not dependent on the hardware structure of the robot apparatus 1. Conversely, a hardware dependent layer controller 104 is responsive to commands from the upper application, that is, the behavior describing module (schema) to directly actuate the hardware (external environment), such as joint actuators. By this configuration, the robot apparatus 1 verifies the own state and the surrounding state, based on the control program, to behave autonomously responsive to a command and an action from the user.

Figure 15:
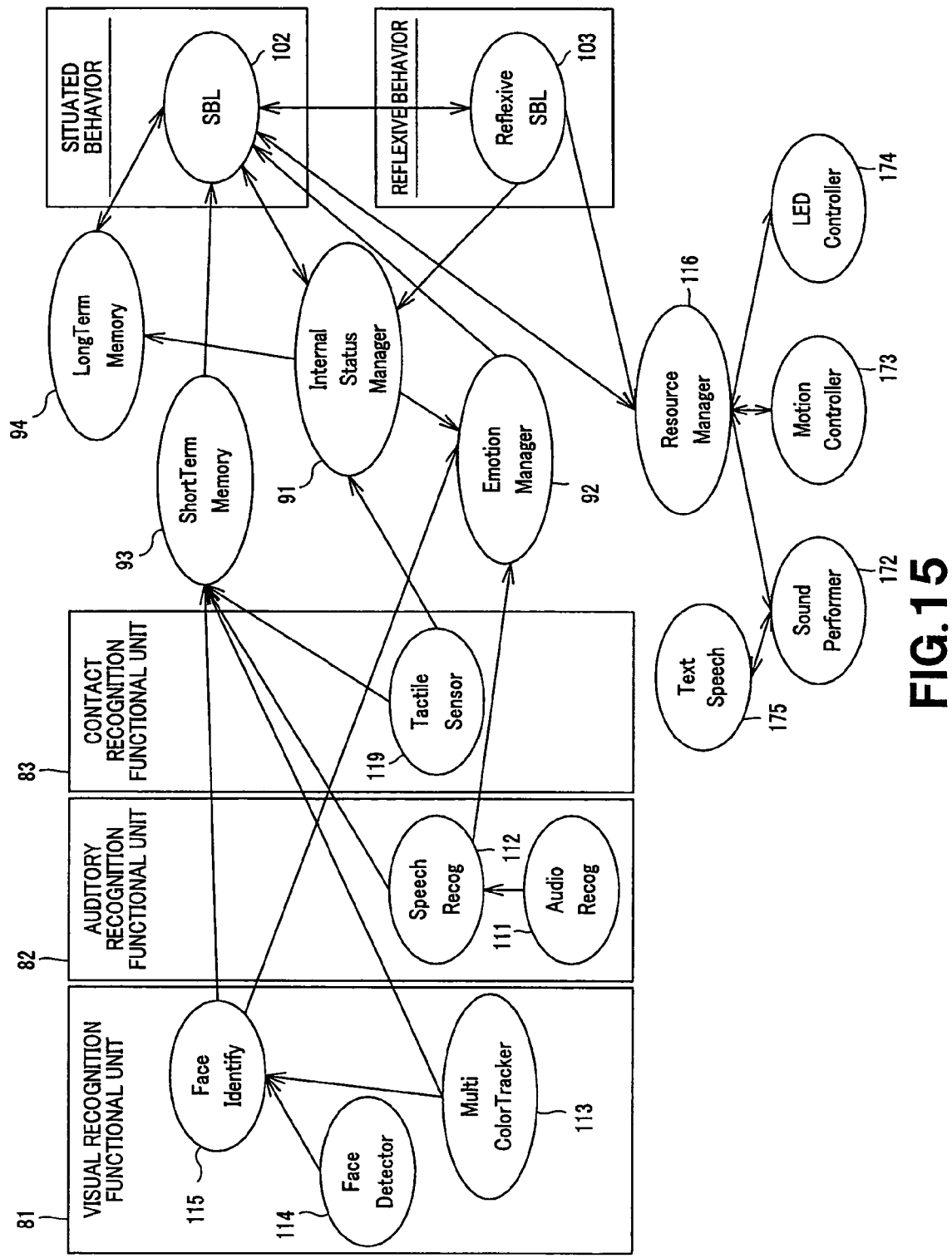
FIG. 15 schematically shows an object configuration of the behavior control system of a robot apparatus embodying the present invention.

The behavior control system 10 is now explained in further detail. FIG. 15 is a schematic view showing an object configuration of the behavior control system 10 of the present embodiment.

Referring to FIG. 15, the visual recognition functional unit 81 is made up by three objects, namely a face detector 114, a multi-color tracker 113, and a face identifier 115.

A face detector 114 is an object for detecting a face area from the picture frame, and outputs the detected result to the face identifier 115. The multi-color tracker 113 is an object for color recognition and outputs the recognized results to the face identifier 115 and to the short term memory (STM) 93. The face identifier 115 identifies a person by, for example, retrieving a hand-held person dictionary for a detected face image to output the ID information to the STM 93, along with the information on the position and the size of the face image area. The face identifier 115 also outputs the person identification certainty to the emotion management unit 92 supervising the emotion.

The auditory recognition functional unit 82 is made up by two objects, namely an Audio Recog 111 and a Speech Recog 112. The Audio Recog 111 is an object for receiving speech data from a speech inputting device, such as a microphone, to extract the feature and to detect the speech domain. The Audio Recog outputs a characteristic value of speech data of the speech domain and the sound source direction to the Speech Recog 112 and to the STM 93. The Speech Recog 112 is an object for performing speech recognition using the characteristic speech value, a speech dictionary and a syntax dictionary, received from the Audio Recog 111, and outputs the set of the recognized words to the STM 93.

The contact recognition functional unit 83 is made up by an object called a tactile sensor 119 for recognizing the sensor input from the contact sensor, and outputs the results recognized to the inner state management unit (ISM) 91 which is an object supervising the inner state or the feeling state (emotion).

The STM 93 is an object forming a short-term storage, and is a functional module for holding a target or an event, recognized by each object of the above recognition system from the external environment, for example, holding an input image from the camera 15, for a short period of time, such as for ca. 15 seconds. The STM periodically notifies external stimuli to the situated behavior layer (SBL) 102 as an STM client.

The LTM 94 is an object forming a long-term storage, and is used for holding the information, obtained by learning, such as object name, for prolonged time. The LTM 94 is able to hold changes in the inner state from the external stimuli in a given behavior describing module (schema) by associative storage.

The internal status management unit 91 is an object forming a long-term storage and is used for holding the information obtained on learning, such as object's names, for prolonged time. The internal status management unit supervises the inner states of the robot apparatus 1, such as instinct or feeling, responsive to the external stimuli (ES) recognized by each object of the above-described recognition system.

The emotion management unit 92 is an object forming the emotion management section, and supervises the emotion of the robot apparatus 1 based on the inner states supervised by the internal status management unit 91 and on the external stimuli recognized by each object of the recognition system.

The situated behavior layer 102 is an object forming the situation-dependent behavior layer. The situated behavior layer 102 is an object which proves an STM client. On receipt periodically from the STM 93 of the information pertinent to the external stimuli (targets or events), the situated behavior layer determines the schema, that is, the behavior describing module to be executed.

The reflexive SBL (situated behavior layer) 103 is an object forming a reflexive behavior unit, and executes a reflexive direct movement of the main body unit, responsive to external stimuli recognized by each object of the above recognition system. For example, the reflexive SBL performs such behavior as following up with a human face, nodding, or avoiding an obstacle detected instantly.

The SBL 102 selects a movement responsive to external stimuli or to changes in the internal state. On the other hand, the reflexive SBL 103 selects a reflexive behavior responsive to the external stimuli. Since behavior selection by these two objects is made independently, there are occasions where computer resources compete with one another when the selected behavior describing modules (schemas) are executed on the main body unit. An object termed a resource manager (RM) 116 arbitrates the hardware competition at the time of behavior selection by the SBL 102 and the reflexive SBL 103. The main body unit of the robot apparatus is actuated on notification to the objects taking part in realizing the movements of the main body unit of the robot based on the results of arbitration.

A sound performer 172, a motion controller 173 and an LED controller 174 are objects for realizing the movements of the main body unit of the robot apparatus. The sound performer 172 is an object for outputting the speech and synthesizes the speech responsive to a text command given from the SBL 102 through RM 116 to output the speech from a loudspeaker on the main body unit of the robot apparatus 1. The motion controller 173 is an object for achieving the movements of the joint actuators on the main body unit of the robot apparatus and calculates relevant joint angles responsive to receipt of a command for causing movements of the arms or legs from the SBL 102 over RM 116. The LED controller 174 is an object for causing flickering of the LED 19 and carries out the flickering actuation of the LED 19 responsive to receipt of the command from the SBL 102 over RM 116.

(3-1) Situation-Dependent Behavior Control

Figure 16:
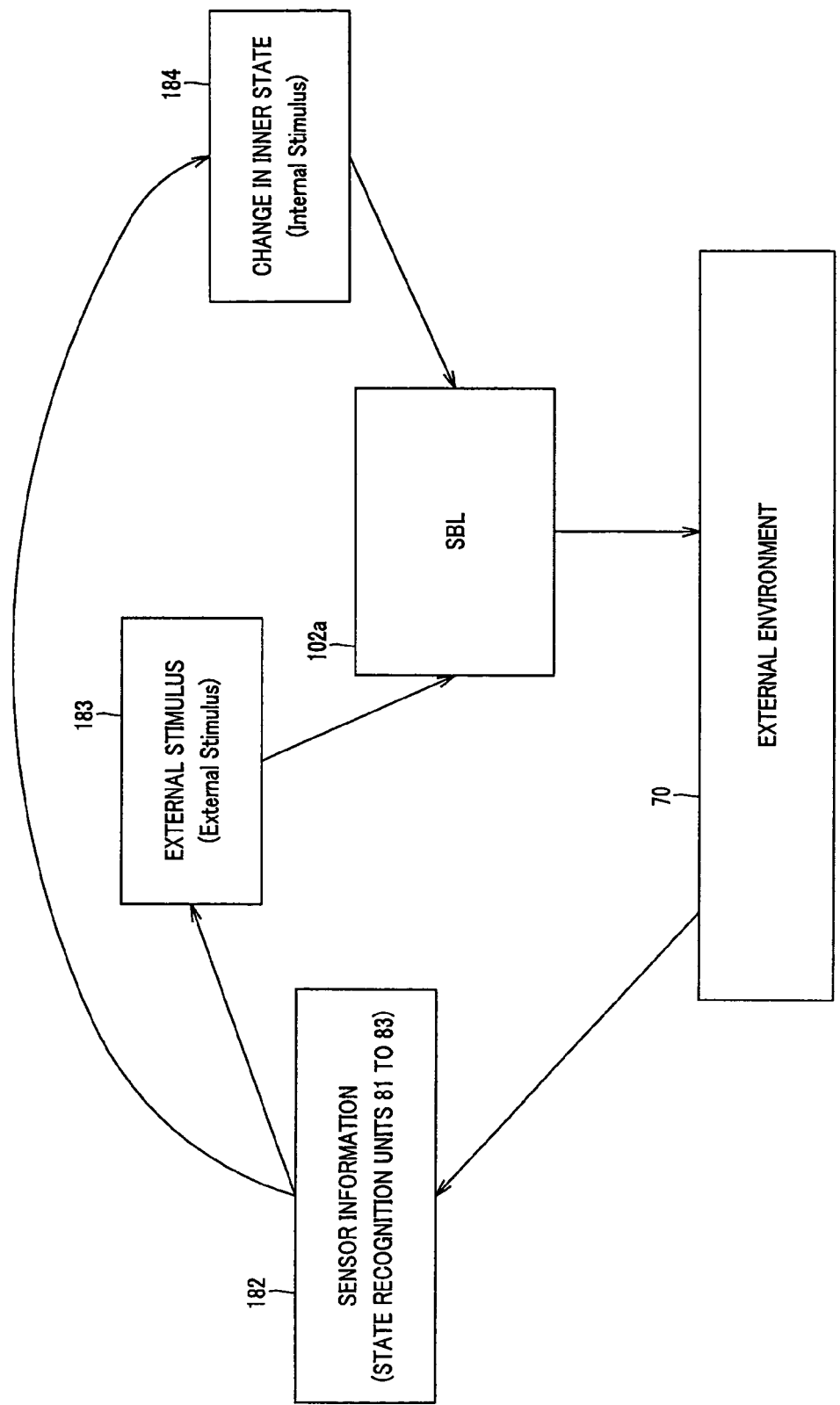
FIG. 16 schematically shows the configuration of the situation dependent behavior control embodying the present invention.

The situation-dependent behavior layer, calculating the activation level AL to select the behavior demonstrated, as explained in the above embodiments, is explained in further detail. FIG. 16 schematically shows the control configuration for the situation-dependent behavior by the situated behavior layer (SBL) inclusive of the reflexive behavior unit. Results of recognition (sensor information) 182 of the external environment 70 in the external stimulus recognition unit 80 composed of the visual recognition functional unit 81, auditory recognition functional unit 82 and the contact recognition functional unit 83 are sent as external stimuli 183 to a situated behavior layer 102a (inclusive of the reflexive situated behavior layer 103). Changes in the inner states 184, responsive to the results of recognition of the external environment 70 by the external stimulus recognition unit 80, are also sent to the situated behavior layer 102a. The situated behavior layer 102a is able to check the situation in dependence upon the external stimuli 183 or the changes in the inner states 184 to realize behavior selection. The activation level AL of each behavior describing module (schema) is calculated by the situated behavior layer 102a depending on external stimuli 183 or the changes in the inner states 184 to select the schema depending on the size of the activation level AL to carry out the behavior (movement). In calculating the activation level AL, a library, for example, may be used to enable the unified computing processing to be carried out for the totality of the schemas. In the library, there are saved a function for calculating the instinct vector from the inner state vector, a function for calculating the satisfaction vector from the inner state vector and a behavior evaluating database for anticipating the anticipated inner state change vector from the external stimuli, as described above.

(3-2) Schema

Figure 17:
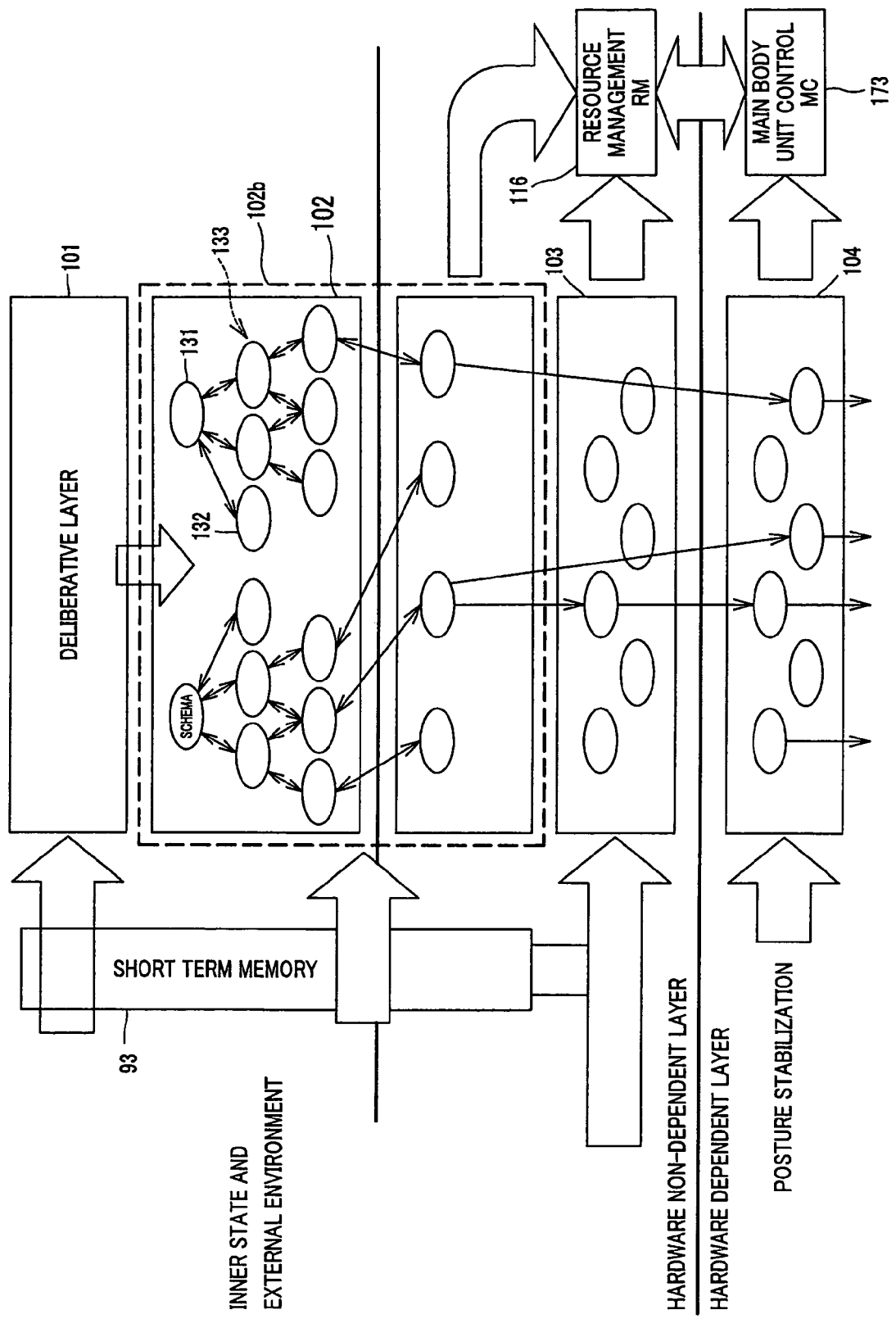
FIG. 17 schematically shows how the situation dependent behavior layer is made up by plural schemas.

FIG. 17 shows how the situated behavior layer 102 is constructed by plural schemas (component behaviors) 131, 132. The situated behavior layer 102 includes a behavior describing module, as the aforementioned component behavior 131, and provides a state machine for each behavior describing module. The situated behavior layer classifies the results of recognition of the external information, entered via sensor, and demonstrates the behavior on the main body unit of the robot apparatus. The behavior describing module, as component behavior 131, is described as a schema having the Monitor function of giving a judgment on the situation depending on the external stimuli or inner states and a state transition attendant on behavior execution (state machine). On the other hand, the behavior describing module, which becomes the component behavior 132, is described as a schema determining the behavior output without regard to the inner state or the external stimuli.

A situated behavior layer 102b (more strictly, the layer in the situated behavior layer 102 controlling the usual situated behavior) is constructed as a tree structure composed of hierarchically interconnected schemas 131, 132, and is adapted to perform behavior control as the optimum schemas 131, 132 are comprehensively verified responsive to the changes in the inner states or external stimuli. The tree structure has a tree 133 including a behavior model comprised of an ethological situation-dependent behavior in mathematical representation and plural sub-trees or branches for demonstrating feeling expressions.

Figure 18:
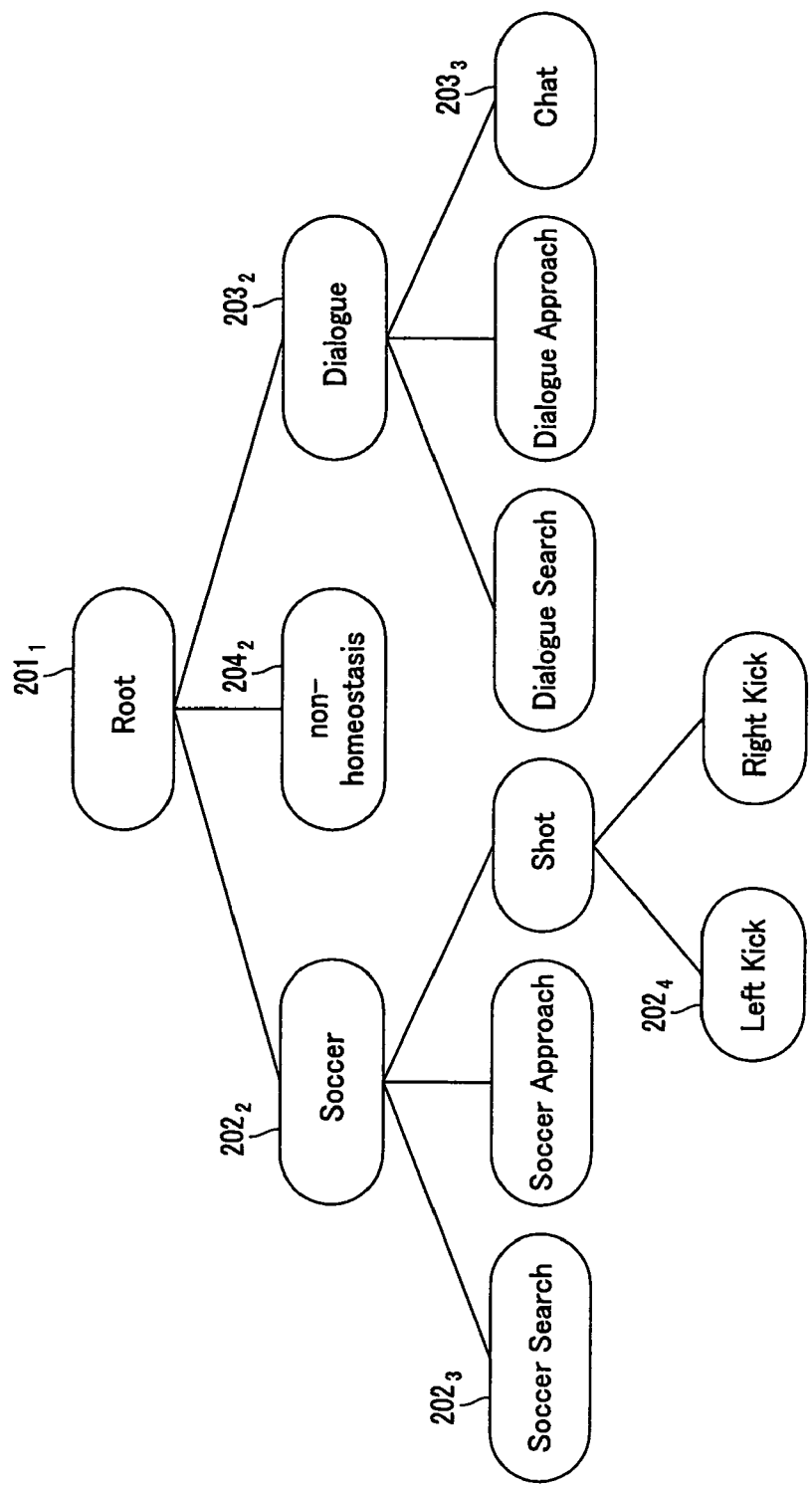
FIG. 18 schematically shows an embodiment of a tree structure of schemas in the situation dependent behavior layer.

FIG. 18 schematically shows a tree structure of schemas in the situated behavior layer 102. Referring to FIG. 18, the situated behavior layer 102 includes schemas from layer to layer, from a root schema $201_1$, receiving the notification of the external stimuli from the short term memory 93, in a direction proceeding from an abstract behavior category towards a more specified behavior category. For example, in a layer directly subjacent to the root schema $201_1$, there are arranged schemas $202_2$, $203_2$, for 'playing soccer' and 'dialog', respectively. In a lower layer of the schema $202_2$, for 'playing soccer', there are arranged plural schemas $202_3$, stating more specified behaviors, such as 'soccer search', 'soccer approach' or 'shot'. In a lower layer of the schema $202_3$, for 'shot', there are arranged plural schemas $202_4$, stating more specified behaviors, pertinent to the behavior of kicking a ball, such as 'Left Kick' or 'Right Kick'. In similar manner, in a lower layer of the schema $232_2$, for 'shot', there are arranged plural schemas $203_3$, stating more specified behaviors, pertinent to the Dialog, such as (Dialog Search', 'Dialog Approach' or 'Chat'.

Each of these schemas is associated with the above-described component behavior 131 and includes a monitor function for giving the situation responsive to the external stimuli or inner states and an Action function for realizing status transition attendant on behavior execution (state machine).

The Monitor function is a function for calculating the activation level AL of the schema, responsive to the external stimuli and to the inner states. Each schema includes the Monitor function as activation level calculating means. In constructing the tree structure, shown in FIG. 18, an upper (parent) schema is able to call the Monitor function of the lower (child) schema, with the external stimuli and the inner states as arguments. The child schema has the activation level AL as a return value. The schema is also able to call the Monitor function of the child schema in order to calculate the own activation level AL. Since the activation level AL from each sub-tree is returned to the root schema from each sub-tree, an optimum schema, that is, an optimum behavior, may comprehensively be verified responsive to changes in the inner states and in the external stimuli. The root schema may be the above-mentioned behavior selection unit 130 by which to select the schema. It is of course possible to observe activation level AL of each schema and to select the behavior based on the value of each activation level AL by the resource manager 116 as later explained and by a separately provided behavior selection unit.

It is also possible for the behavior selection unit 130 to select the schema having the highest activation level AL, or to select two or more schemas, the activation level AL of which has exceeded a preset threshold value, to execute the so selected schemas in parallel. It is, however, presupposed that, for such parallel operation, there is no hardware competition among respective schemas.

The Action function includes a state machine describing the behavior owned by the schema itself. In constructing the tree structure shown in FIG. 18, the parent schema may call the action function to start or interrupt execution of the child schema. In the present embodiment, the state machine of the Action is not initialized unless it is Ready. In other words, the status is not reset even on interruption and work data being executed by the schema is saved, so that re-execution on interruption is possible.

Meanwhile, in case the tree structure is formed by solely the schemas associated with the component behaviors 131, the role of these schemas is to achieve the homeostatic behavior for maintaining the inner state associated with the robot apparatus 1 to within the specified gamut. Thus, if the inner state of the robot apparatus 1 is sufficiently satisfied, the activation level AL calculated by each schema is that low.

However, with the behavior selection unit 130, the schema is selected depending on the size of the activation level AL, the schema having the relative highest activation level AL is selected and the behavior described in the schema is demonstrated.

Thus, in the present embodiment, a component behavior 132 is provided, independently of the component behavior 131, for calculating the activation level AL which remains constant at all times irrespective of the inner states or the external stimuli. In this component behavior 132, there is stated a non-homeostatic behavior not aimed to maintain the inner state of the robot apparatus 1 within a preset gamut (the behavior of turning towards a sound source or swinging arms to no purpose).

A schema $204_2$ 'non-homeostasis' in the tree structure shown in FIG. 18 corresponds to this component behavior 132 and is provided in a layer directly subjacent to the root schema $201_1$.

The behavior selection unit 130 selects the schema having e.g. the highest activation level AL, as described previously, so that, if the activation level AL, calculated by the schema associated with the component behavior 131, is lower than the activation level AL, calculated by the schema $204_2$ associated with the component behavior 132, the behavior described by the schema $204_2$ is output.

Figure 19:
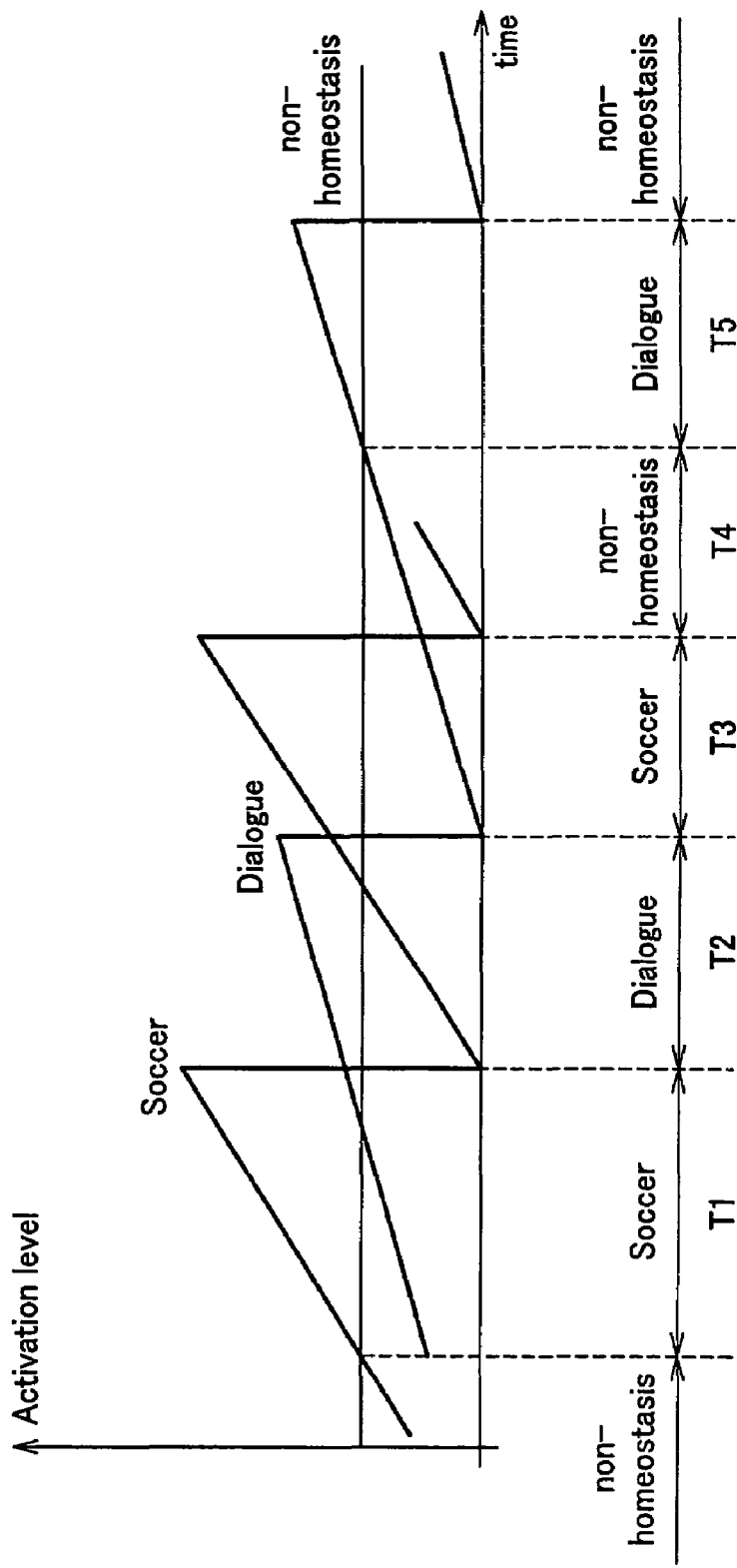
FIG. 19 shows typical transition of the component behavior selected in a layer directly subjacent to the root schema.
Figure 20A:
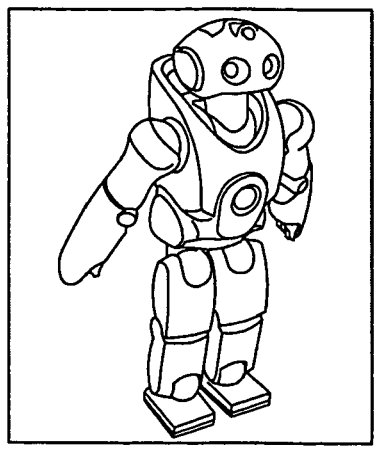
FIG. 20 shows a typical basic posture for emotion for each emotion.
Figure 20B:
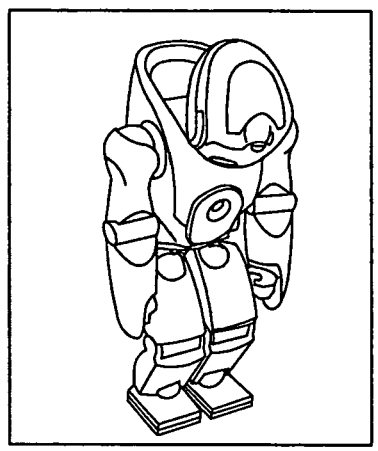
Figure 20C:
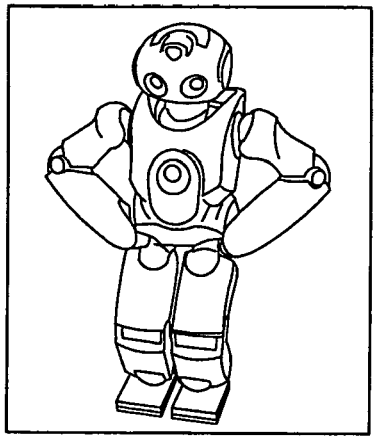
Figure 20D:
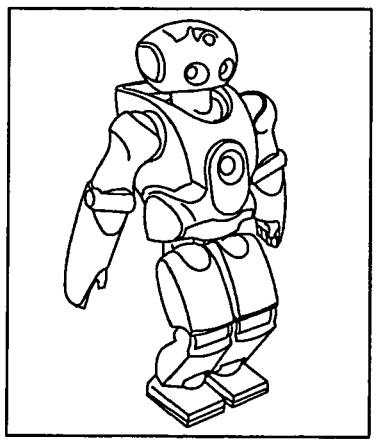
Figure 20E:
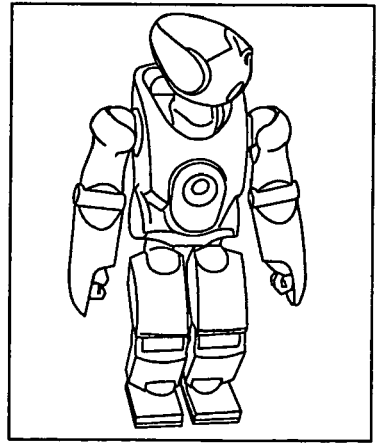
Figure 20F:
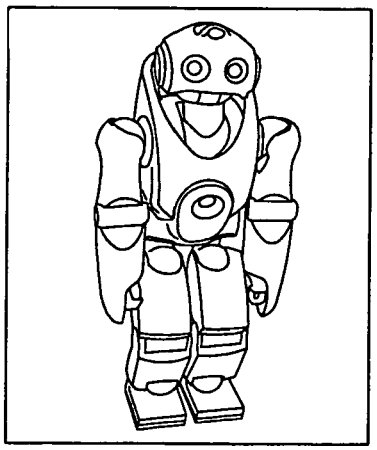
Figure 21:
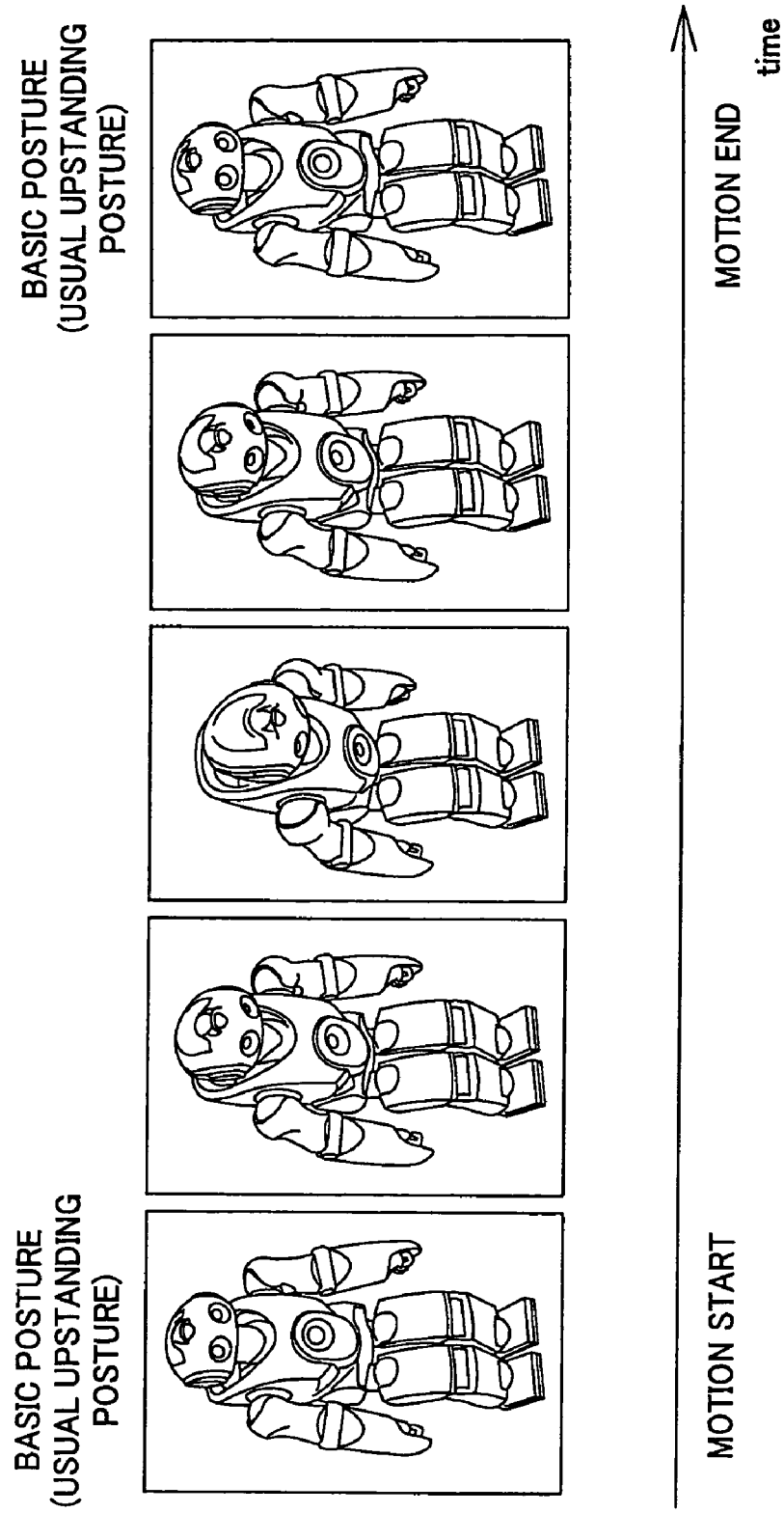
FIG. 21 shows a bow motion in the 'neutral' emotion.
Figure 22:
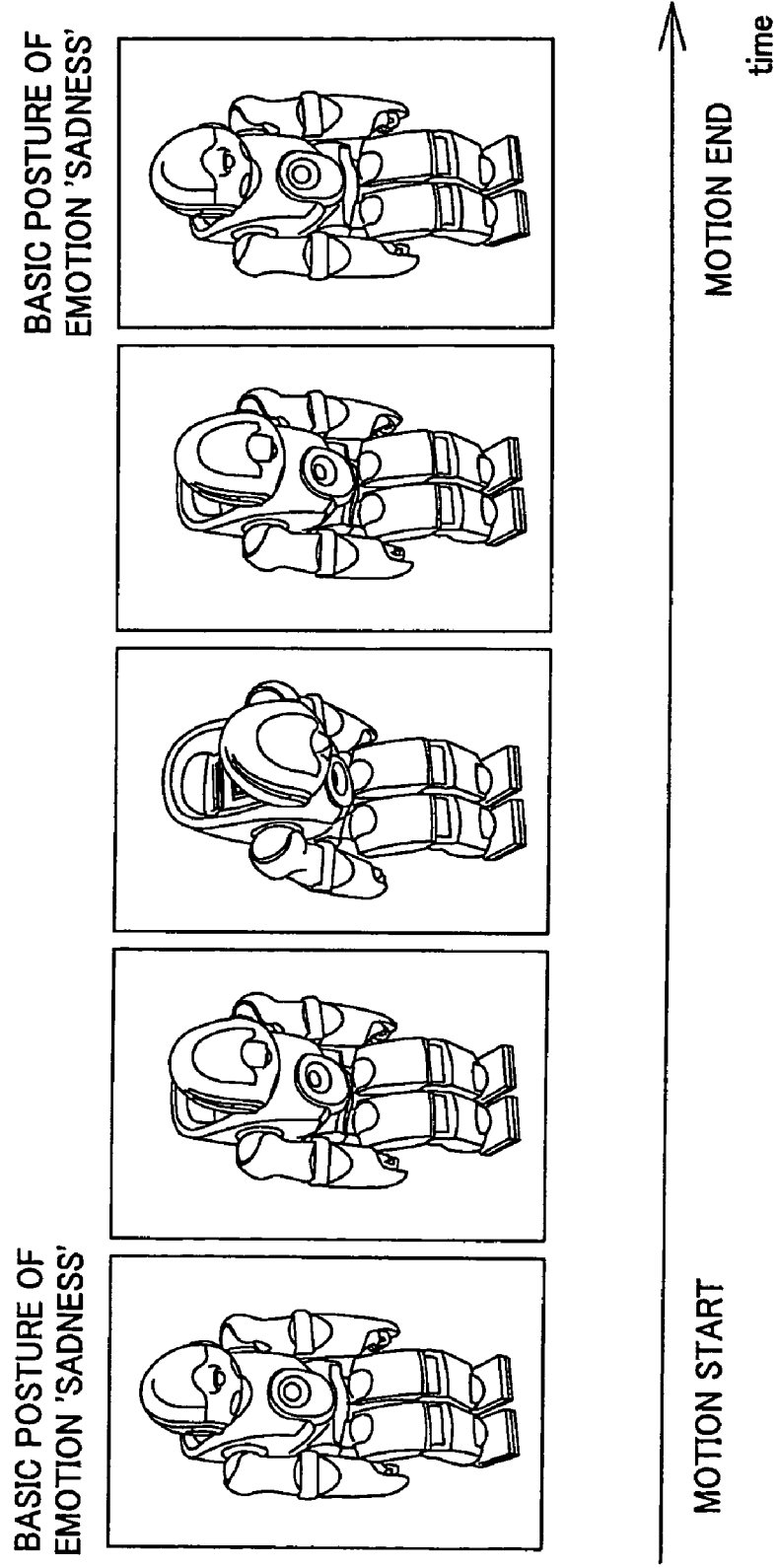
FIG. 22 shows a bow motion in the 'sadness' emotion.

Specifically, FIG. 19 shows typical transition of the component behaviors selected in the layer directly subjacent to the root schema $201_1$. It is assumed that the activation level AL of the schemas 'soccer', 'dialog' and 'non-homeostasis' has undergone transition as shown with lapse of time. In FIG. 19, the activation level AL for 'soccer' is highest for time T1, and hence the behavior selection unit 130 selects this schema 'soccer', so that the robot apparatus 1 outputs the behavior of playing soccer. In similar manner, the schemas 'dialog' and 'soccer' are selected for time T2 and T3, so that the behaviors described in these schemas are output. For time T4, the activation levels AL of the schemas 'dialog' and 'soccer' are lower than the activation level AL of the schema 'non-homeostasis'. Hence, the behavior not aimed to maintain the inner state of the robot apparatus 1 within the specified gamut is output for time T4. For time T5, the activation level AL of the schema 'dialog' is again higher and hence this schema is selected by the behavior selection unit 130.

The robot apparatus 1 has interactions with the environment, as the behavior demonstrated is caused to undergo transition. In particular, in demonstrating the respective component behaviors in the robot apparatus 1, the emotion is expressed by basic postures which are the postures at the start time point of one or more movements (motions) forming the component behaviors.

Here, the motions are expressed by how the resources are actuated as from the basic postures at the start time points (upstanding posture, sitting posture and lying-down posture) and by which is the basic posture to which the apparatus transfers on motion termination. It is noted that the basic posture on motion termination is the same as the basic posture at the motion start point.

The robot apparatus 1 provides variations for expressing the emotion to the basic posture (basic postures for emotion). The emotion is expressed by actuating the resources from these basic postures for the emotion and by again reverting to the basic postures fro the emotion. At this time, the robot apparatus 1 holds data, such as joint angles, in the courser of the motions, as relative angles. In this manner, the motion of expressing the emotion may be demonstrated by simply holding the basic postures from emotion to emotion.

FIG. 20 shows an example of the basic postures for the emotion in case the basic posture is the upstanding posture. FIGS. 20a to 20f show basic postures for the emotion for joy, sadness, anger, surprise, disgust and fear.

For example, when a bow motion is performed with the 'neutral' emotion, the apparatus first starts from the basic posture of the upstanding posture and bends the waist part forwards to revert again to the basic posture. When a bow motion is performed with the 'sadness' emotion, the apparatus first starts from the basic posture for emotion of 'sadness' and bends the waist part forwards to revert again to the basic posture of 'sadness'.

Figure 23:
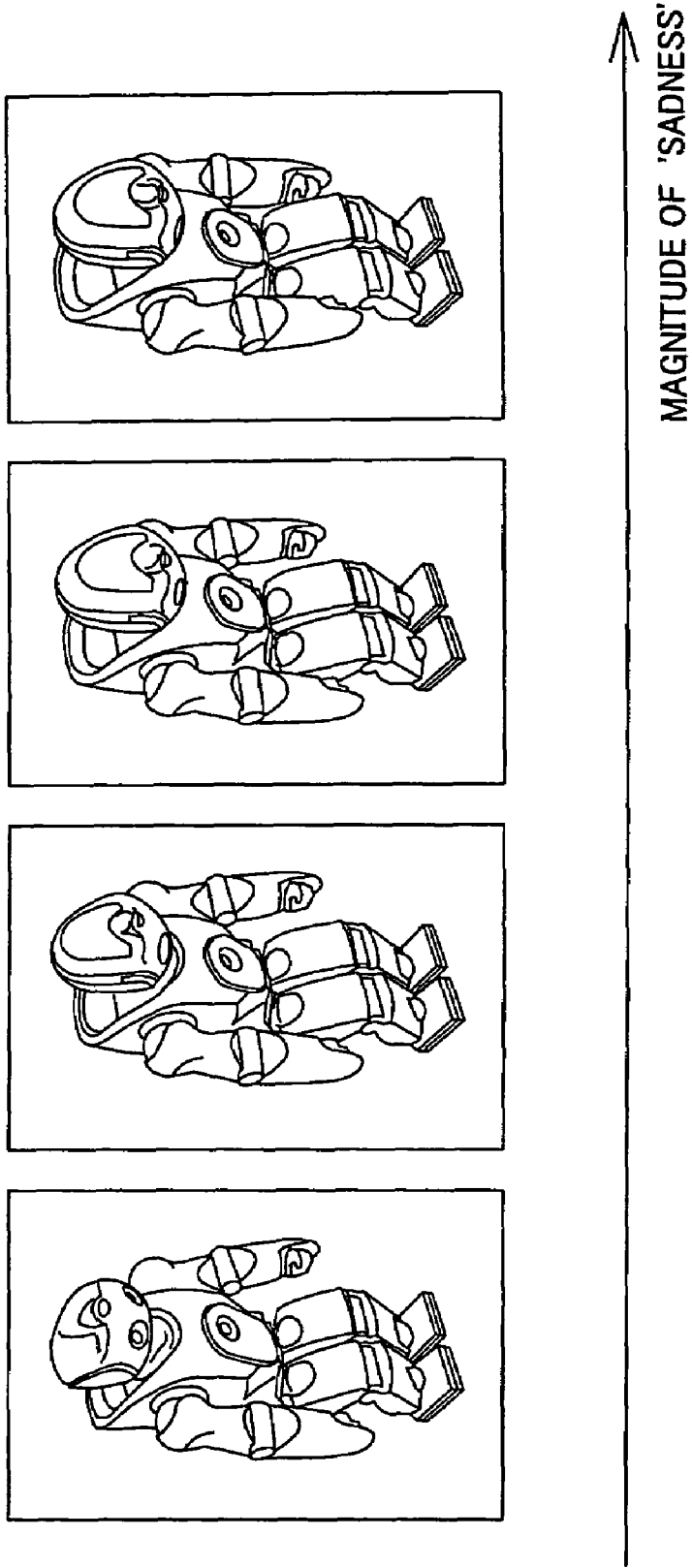
FIG. 23 shows a typical relation between the size of the emotion 'sadness' and the basic posture.

When the emotion has a size, such as 'joy', 'sadness' or 'fear', the basic posture for the emotion, dependent on the size of the emotion, may be output. For example, in the case of the emotion of 'sadness', the basic posture for the emotion may be that reflecting the size of the emotion, as shown in FIG. 23. That is, as the size of the emotion 'sadness' becomes larger, the posture with the shoulder sagging down more apparently becomes the basic posture. In this case, the size of the emotion may be classed into plural levels for each of which there may be provided the basic posture for emotion. The joint angles for the basic postures for emotion for the largest emotion size and for the basic postures for emotion for the smallest emotion size may be linearly interpolated and the basic postures for the emotion may be generated from different values of the emotion size.

Thus, the present robot apparatus 1 demonstrates the emotion by its own behavior and consequently is rich in the force of expression of the emotion, while no actuator is needed for expressing the emotion. The emotion representation employing the LED 19 may be used in combination, whereby the force of emotion expression may be raised further. In particular, the emotion is represented by the basic posture which is the posture at the motion beginning time, so that the storage capacity for holding motion data may be reduced.

What is claimed is:

1. An autonomous robot apparatus having an emotion model, or a modeled emotion, and capable of expressing the own emotion, comprising:
    emotion management means for detecting and supervising the emotion of the robot apparatus;
    a plurality of behavior describing modules, each describing a preset behavior; and
    behavior selection means for selecting one or more of said behavior describing modules for demonstrating the behavior described in the behavior describing module selected;
    wherein when one of the behavior describing modules is selected by said behavior selection means, said selected behavior describing module causes a change in a basic posture as a posture at each beginning time point of one or plural motions forming the behavior described in the selected behavior describing module, responsive to the current emotion detected by said emotion management means, and
    wherein the selected behavior describing module ends the motion with a same posture as the posture at the beginning time point of the motion.

2. The robot apparatus according to claim 1
    wherein said behavior describing module includes a basic posture corresponding to each emotion and, on selection by said behavior selection means, selects the basic posture corresponding to the current emotion as detected by said emotion management means.

3. The robot apparatus according to claim 1
    wherein said behavior describing module varies the basic posture corresponding to said emotion depending on the size of the current emotion.

4. The robot apparatus according to claim 3
    wherein the basic posture for the minimum size of the emotion and the basic posture for the maximum size thereof are stated in said behavior describing module, and
    wherein said behavior describing module generates the basic posture to be output by interpolating the basic posture for the minimum size of the emotion and the basic posture for the maximum size thereof, depending on the size of the current emotion as detected by said emotion management means, to generate the basic posture to be output.

5. The robot apparatus according to claim 1
    wherein said emotion at least includes joy, sadness, anger, surprise, disgust, fear and neutral.

6. An emotion representing method for an autonomous robot apparatus having an emotion model, or a modeled emotion, and capable of expressing the own emotion, comprising:
    an emotion management step of detecting and supervising the emotion of the robot apparatus;
    a behavior selection step of selecting one or a plurality of said behavior describing modules, each describing a preset behavior, for demonstrating the behavior described in the selected behavior describing module;
    wherein when one of the behavior describing modules is selected by said behavior selection step, said selected behavior describing module causes a change in a basic posture as a posture at each beginning time point of one or plural motions forming the behavior described in the selected behavior describing module, responsive to the current emotion detected by said emotion management step, and
    wherein the selected behavior describing module ends the motion with a same posture as the posture at the beginning time point of the motion.

7. The emotion representing method for an autonomous robot apparatus according to claim 6
    wherein said behavior describing module includes a basic posture corresponding to each emotion and, on selection by said behavior selection step, selects the basic posture corresponding to the current emotion as detected by said emotion management step.

8. The emotion representing method for an autonomous robot apparatus according to claim 6
    wherein said behavior describing module varies the basic posture corresponding to said emotion depending on the size of the current emotion.

9. The emotion representing method for an autonomous robot apparatus according to claim 8
    wherein the basic posture for the minimum size of the emotion and the basic posture for the maximum size thereof are stated in said behavior describing module, and
    wherein said behavior describing module generates the basic posture to be output by interpolating the basic posture for the minimum size of the emotion and the basic posture for the maximum size thereof, depending on the size of the current emotion as detected by said emotion management step, to generate the basic posture to be output.

10. The emotion representing method for an autonomous robot apparatus according to claim 6
    wherein said emotion at least includes joy, sadness, anger, surprise, disgust, fear and neutral.

* * * * *